(12) United States Patent
Wallace et al.

(10) Patent No.: US 9,669,371 B2
(45) Date of Patent: Jun. 6, 2017

(54) HYDROGEN GENERATION SYSTEMS UTILIZING SODIUM SILICIDE AND SODIUM SILICA GEL MATERIALS

(71) Applicant: Intelligent Energy Limited, Loughborough (GB)

(72) Inventors: Andrew P. Wallace, Davis, CA (US); John M. Melack, Winters, CA (US); Michael Lefenfeld, New York, NY (US)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 14/733,596

(22) Filed: Jun. 8, 2015

(65) Prior Publication Data

US 2015/0329357 A1 Nov. 19, 2015

Related U.S. Application Data

(63) Continuation of application No. 12/750,527, filed on Mar. 30, 2010, now Pat. No. 9,079,146.
(Continued)

(51) Int. Cl.
*H01M 8/06* (2016.01)
*C01B 3/06* (2006.01)
(Continued)

(52) U.S. Cl.
CPC ...... *B01J 7/02* (2013.01); *C01B 3/06* (2013.01); *C01B 3/065* (2013.01);
(Continued)

(58) Field of Classification Search
CPC .. H01M 8/0606; Y02E 60/324; Y02E 60/362; C01B 3/065; C01B 3/06; B01J 7/02
See application file for complete search history.

(56) References Cited

U.S. PATENT DOCUMENTS 1,665,264 A 4/1928 Holmes et al.
1,939,647 A 12/1933 Arnold et al.
(Continued)

FOREIGN PATENT DOCUMENTS

CA 2587563 A1 5/2006
CN 101031507 A 9/2007
(Continued)

OTHER PUBLICATIONS

Supplementary European Search Report and European Search Opinion for corresponding EP application No. 10759306; mailed Oct. 17, 2012.
(Continued)

*Primary Examiner* — Stanley Silverman
*Assistant Examiner* — Syed Iqbal
(74) *Attorney, Agent, or Firm* — Baker & Hostetler LLP

(57) ABSTRACT

Systems, devices, and methods combine reactant materials and aqueous solutions to generate hydrogen. The reactant materials can sodium silicide or sodium silica gel. The hydrogen generation devices are used in fuels cells and other industrial applications. One system combines cooling, pumping, water storage, and other devices to sense and control reactions between reactant materials and aqueous solutions to generate hydrogen. Multiple inlets of varied placement geometries deliver aqueous solution to the reaction. The reactant materials and aqueous solution are churned to control the state of the reaction. The aqueous solution can be recycled and returned to the reaction. One system operates over a range of temperatures and pressures and includes a hydrogen separator, a heat removal mechanism, and state of reaction control devices. The systems, devices, and methods of generating hydrogen provide thermally stable solids, near-instant reaction with the aqueous solutions, and a non-toxic liquid by-product.

17 Claims, 35 Drawing Sheets

Related U.S. Application Data

(60) Provisional application No. 61/164,888, filed on Mar. 30, 2009, provisional application No. 61/185,579, filed on Jun. 9, 2009.

(51) Int. Cl.
  *B01J 7/02* (2006.01)
  *H01M 8/0606* (2016.01)

(52) U.S. Cl.
  CPC ......... *H01M 8/0606* (2013.01); *Y02E 60/324* (2013.01); *Y02E 60/362* (2013.01)

(56) References Cited

U.S. PATENT DOCUMENTS

| | | | |
|---|---|---|---|
| 1,997,340 A | 4/1935 | Osborg | |
| 2,378,290 A | 6/1945 | Drake et al. | |
| 2,731,326 A | 1/1956 | Alexander et al. | |
| 2,765,242 A | 10/1956 | Alexander et al. | |
| 3,033,800 A | 5/1962 | Elliott, Jr. et al. | |
| 3,033,801 A | 5/1962 | Kloepfer et al. | |
| 3,079,234 A | 2/1963 | Jenkins et al. | |
| 3,165,379 A | 1/1965 | Schwartz et al. | |
| 3,274,277 A | 9/1966 | Bloch et al. | |
| 3,322,495 A | 5/1967 | Magee | |
| 3,489,516 A | 1/1970 | Kummerle | |
| 3,493,341 A | 2/1970 | Le Page et al. | |
| 3,507,810 A | 4/1970 | Sanborn et al. | |
| 3,527,563 A | 9/1970 | Shanklin | |
| 3,535,262 A | 10/1970 | Hubbuch et al. | |
| 3,575,885 A | 4/1971 | Hunter et al. | |
| 3,576,891 A | 4/1971 | Rosenthal | |
| 3,658,724 A | 4/1972 | Stiles | |
| 3,670,033 A | 6/1972 | Izawa et al. | |
| 3,679,605 A | 7/1972 | Sanford et al. | |
| 3,793,382 A | 2/1974 | Higuchi et al. | |
| 3,794,712 A | 2/1974 | Aboutboul et al. | |
| 3,801,705 A | 4/1974 | Krekeler et al. | |
| 3,878,289 A | 4/1975 | Beavon | |
| 3,915,995 A | 10/1975 | Holmes et al. | |
| 3,954,896 A | 5/1976 | Shima et al. | |
| 4,087,477 A | 5/1978 | Tazuma et al. | |
| 4,168,247 A | 9/1979 | Hayden et al. | |
| 4,248,741 A | 2/1981 | Wernli et al. | |
| 4,353,815 A | 10/1982 | Antos | |
| 4,366,091 A | 12/1982 | Antos | |
| 4,394,302 A | 7/1983 | Miller et al. | |
| 4,413,156 A | 11/1983 | Watts, Jr. et al. | |
| 4,435,606 A | 3/1984 | Motz et al. | |
| 4,440,631 A | 4/1984 | Togari et al. | |
| 4,446,251 A | 5/1984 | Bartley et al. | |
| 4,471,075 A | 9/1984 | Bartley et al. | |
| 4,508,930 A | 4/1985 | Wideman et al. | |
| 4,633,029 A | 12/1986 | Tillett, Jr. et al. | |
| 4,737,161 A | 4/1988 | Szydlowski et al. | |
| 4,769,501 A | 9/1988 | Iwahara | |
| 4,837,194 A | 6/1989 | Hayden | |
| 4,975,405 A | 12/1990 | Okamura et al. | |
| 4,982,044 A | 1/1991 | Smith | |
| 5,008,480 A | 4/1991 | Slaugh | |
| 5,128,291 A | 7/1992 | Wax et al. | |
| 5,292,985 A | 3/1994 | Lattner et al. | |
| 5,372,617 A | 12/1994 | Kerrebrock et al. | |
| 5,593,640 A | 1/1997 | Long et al. | |
| 5,741,999 A | 4/1998 | Kazumi et al. | |
| 5,856,262 A | 1/1999 | Flick et al. | |
| 6,022,823 A | 2/2000 | Augustine et al. | |
| 6,096,934 A | 8/2000 | Rekoske | |
| 6,103,403 A | 8/2000 | Grigorian et al. | |
| 6,191,059 B1 | 2/2001 | Varanasi | |
| 6,309,620 B1 | 10/2001 | Schlegel et al. | |
| 6,358,488 B1 | 3/2002 | Suda | |
| 6,399,528 B1 | 6/2002 | Krell et al. | |
| 6,403,852 B1 | 6/2002 | Yamamoto et al. | |
| 6,423,286 B1 | 7/2002 | Gryko | |
| 6,492,014 B1 | 12/2002 | Rolison et al. | |
| 6,497,973 B1 | 12/2002 | Amendola | |
| 6,534,033 B1 | 3/2003 | Amendola et al. | |
| 6,544,400 B2 | 4/2003 | Hockaday et al. | |
| 6,548,711 B2 | 4/2003 | Yamamoto et al. | |
| 6,586,636 B2 | 7/2003 | Kelly | |
| 6,706,928 B2 | 3/2004 | Kelly | |
| 6,745,801 B1 | 6/2004 | Cohen et al. | |
| 6,746,496 B1 | 6/2004 | Kravitz et al. | |
| 6,818,334 B2 | 11/2004 | Tsang | |
| 6,821,499 B2 | 11/2004 | Jorgensen | |
| 6,901,302 B2 | 5/2005 | Kami | |
| 6,904,533 B2 | 6/2005 | Kuo et al. | |
| 6,932,847 B2 | 8/2005 | Amendola et al. | |
| 6,939,529 B2 | 9/2005 | Strizki et al. | |
| 7,052,671 B2 | 5/2006 | McClaine et al. | |
| 7,074,509 B2 | 7/2006 | Rosenfeld et al. | |
| 7,083,657 B2 | 8/2006 | Mohring et al. | |
| 7,105,033 B2 | 9/2006 | Strizki et al. | |
| 7,115,244 B2 | 10/2006 | Zhao et al. | |
| 7,211,539 B2 | 5/2007 | Lefenfeld | |
| 7,271,567 B2 | 9/2007 | Dunn et al. | |
| 7,316,788 B2 | 1/2008 | Autrey | |
| 7,393,369 B2 | 7/2008 | Shurtleff | |
| 7,410,567 B2 | 8/2008 | Lefenfeld et al. | |
| 7,578,992 B2 | 8/2009 | Mohajeri et al. | |
| 7,648,786 B2 | 1/2010 | Shurtleff et al. | |
| 7,670,698 B2 | 3/2010 | Eickhoff et al. | |
| 7,682,411 B2 | 3/2010 | Jones et al. | |
| 7,811,541 B2 | 10/2010 | Lefenfeld et al. | |
| 2002/0090539 A1 | 7/2002 | Getty et al. | |
| 2004/0191588 A1 | 9/2004 | Eshraghi et al. | |
| 2005/0022883 A1 | 2/2005 | Adams et al. | |
| 2006/0002839 A1* | 1/2006 | Lefenfeld | C01B 3/06 423/344 |
| 2006/0059778 A1* | 3/2006 | Shurtleff | B01J 7/02 48/61 |
| 2007/0020172 A1* | 1/2007 | Withers-Kirby | C01B 3/065 423/648.1 |
| 2007/0039515 A1 | 2/2007 | Bandoh et al. | |
| 2007/0039815 A1 | 2/2007 | Bartel | |
| 2007/0041897 A1 | 2/2007 | Eickhoff et al. | |
| 2007/0124989 A1 | 6/2007 | Eickhoff et al. | |
| 2007/0237995 A1 | 10/2007 | Eickhoff et al. | |
| 2007/0272547 A1 | 11/2007 | Vanden Bussche et al. | |
| 2008/0026269 A1 | 1/2008 | Shurtleff et al. | |
| 2008/0102024 A1 | 5/2008 | Bae et al. | |
| 2009/0008089 A1 | 1/2009 | Zubrin et al. | |
| 2009/0035624 A1 | 2/2009 | Kobayashi | |
| 2010/0247426 A1 | 9/2010 | Wallace et al. | |
| 2010/0316917 A1 | 12/2010 | Lefenfeld et al. | |
| 2011/0194992 A1 | 8/2011 | Barton et al. | |
| 2011/0212373 A1 | 9/2011 | Sarata et al. | |
| 2011/0311895 A1 | 12/2011 | Spare et al. | |
| 2011/0313589 A1 | 12/2011 | Iyer et al. | |

FOREIGN PATENT DOCUMENTS

| | | |
|---|---|---|
| CN | 101296859 A | 10/2008 |
| EP | 1845572 A1 | 10/2007 |
| JP | 2007-500829 A | 1/2007 |
| JP | 2007-520407 A | 7/2007 |
| JP | 2007-317649 A | 12/2007 |
| JP | 2008-532893 A | 8/2008 |
| WO | WO 00/17104 A1 | 3/2000 |
| WO | WO 2005/051839 A2 | 6/2005 |
| WO | WO 2005/123586 A2 | 12/2005 |
| WO | WO 2006/101214 A1 | 9/2006 |
| WO | WO 2006/135896 A2 | 12/2006 |
| WO | WO 2010/114849 A1 | 10/2010 |
| WO | WO 2011/097198 A1 | 8/2011 |

OTHER PUBLICATIONS

Partial European Search Report for EP 12187231.1 dated Dec. 18, 2012.

(56) References Cited

OTHER PUBLICATIONS

Cros et al., "Sur deux nouvelles phases du systeme silicium-sodium[Two new Phases of the Silicon-Sodium System]" C.R. Acad. Sc. Paris 260:4764-4767 (1965).
Gryko et al., "NMR Studies of Na Atoms in silicon clathrate compounds," Phys. Rev. B 54(5):3037-3039 (1996).
He et al., "NMR and X-ray Spectroscopy of Sodium-Silicon Clathrates," J. Phys. Chem. B 105:3475-3485 (2001).
Kishi et al., "Geometric an electronic structure of silicon-sodium binary clusters. I. Ionization energy of SiNa," J. Chem. Phys. 107(8):3056-3070 (1997).
Ma et al., "A versatile low temperature synthetic route to Zintl phase precursors: NaSi NaGe and KGe as examples," Dalton Transaction, pp. 1-6, The Royal Society of Chemistry (2009).
Mayeri et al., "NMR Study of the Synthesis of Alkyl-Terminated Silicon Nanoparticles from the Reaction of SiCl with the Zintl Salt, NaSi," Chem. Mater. 13:765-770 (2001).
Novotny et al., "Uber eine ternare Verbindung im System Aluminium-Silizium-Natrium [A Ternary Compound in the System Aluminum-Silicon-Sodium]," Metallforsch. 2:76-80 (1947).
Savin et al., "Pseudopotential Calculations on Alkali Silicide Clusters with Si and Tetrahedral Si Backbones," J. Am. Chem. Soc. 110:373-375 (1988).
Witte et al., "Die Kristallstruktur von NaSi and NaGe," Zeit Anorgan Allege Chemie 327:260-273 (1964).
International Search Report from PCT/US04/39304, dated Jan. 6, 2006.
International Search Report from PCT/US2005/20766, dated May 2, 2006.
Office Action and Search Report from corresponding European Patent Application No. 05785526.4.
J. Witte et al.; English Translation of "The Behavior of Alkali Metals Relative to Semimetals XI, The Crystal Structure of NaSi and NaGe," Z. anorg. Allg. Chem. 327:260-273, 1964. (Originally submitted in German).
International Preliminary Report on Patentability of International Application No. PCT/US2010/029257, dated Oct. 13, 2011.
"Declaration of Interference" in Patent Interference 105,883 dated Mar. 30, 2012.
"Judgement" in favor in Patent Interference 105,883 dated Apr. 23, 2012.
International Search Report and Written Opinion of International Application No. PCT/US2010/029257, dated Jun. 1, 2010.
European Patent Application No. 16158817.3; Extended Search Report; dated Jun. 9, 2016; 8 pages.

* cited by examiner

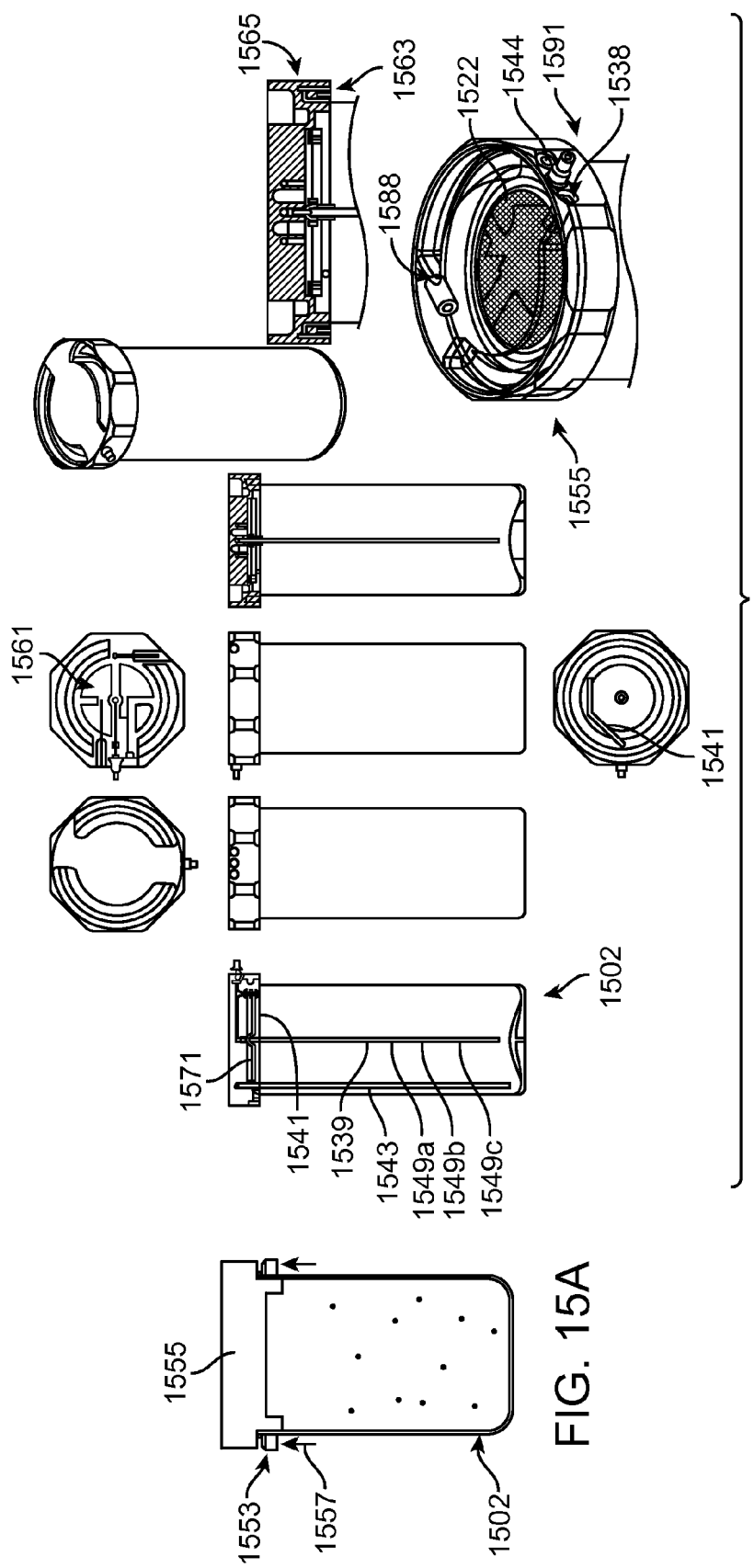

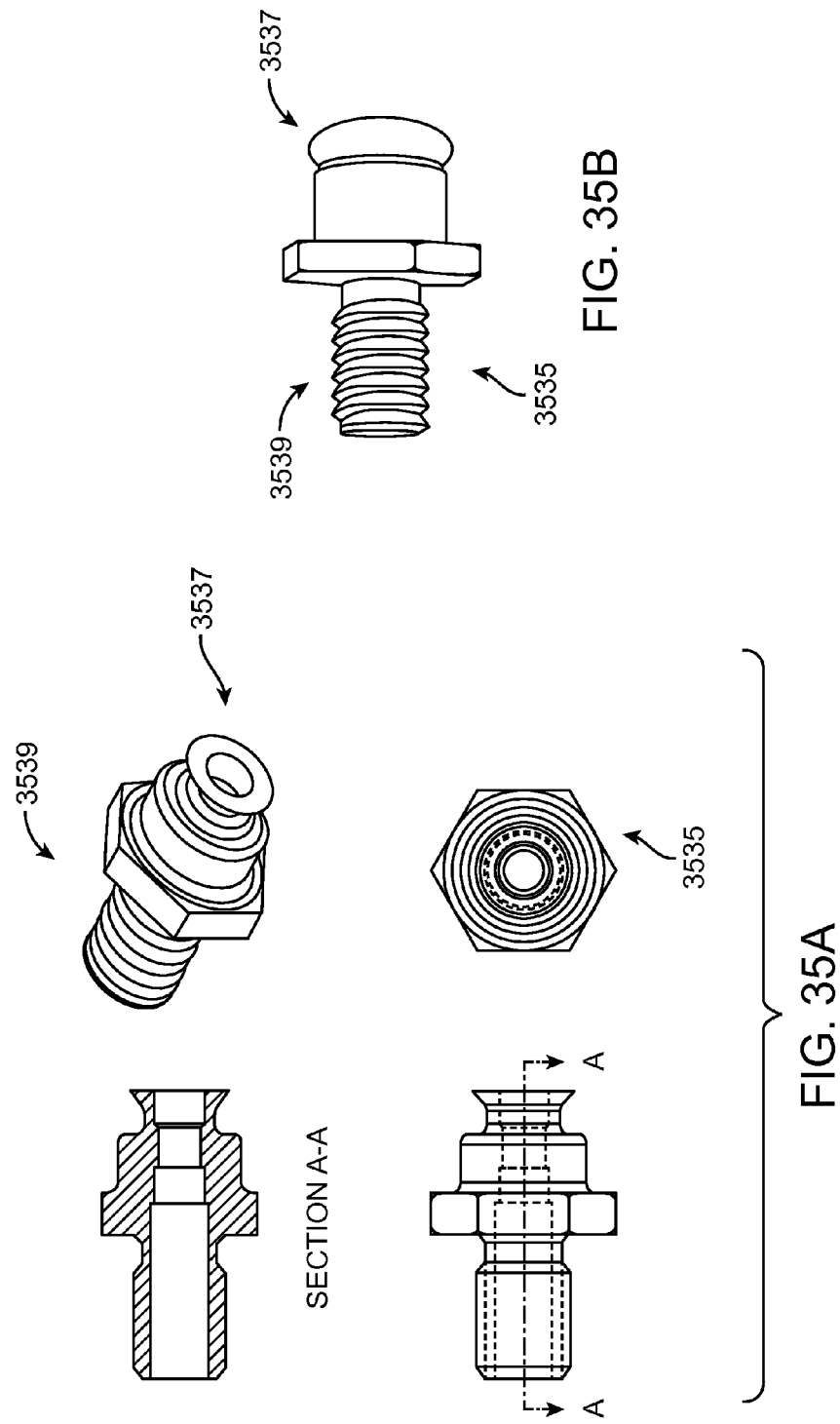

HYDROGEN GENERATION SYSTEMS UTILIZING SODIUM SILICIDE AND SODIUM SILICA GEL MATERIALS

CROSS REFERENCE TO RELATED APPLICATION

This application claims benefit of priority of U.S. Provisional Patent Application Ser. No. 61/164,888 filed on Mar. 30, 2009, and U.S. Provisional Patent Application Ser. No. 61/185,579 filed on Jun. 6, 2009, the entire disclosures of which are incorporated herein by reference. This application is a continuation of U.S. patent application Ser. No. 12/750,527, filed on Mar. 30, 2010, and is related to U.S. patent application ser. No. 13/761,452, filed on Feb. 7, 2013, the entire disclosures of which are incorporated herein by reference.

FEDERALLY-SPONSORED RESEARCH AND DEVELOPMENT

This invention was made with government support under contract number DE-FG36-08G088108 awarded by the U.S. Department of Energy. The U.S. Government has certain rights in this invention.

TECHNOLOGICAL FIELD

This technology generally relates to systems and methods of generating hydrogen using a reactant fuel material and an aqueous solution, and more particularly, to systems and methods for generating hydrogen using sodium silicide, sodium silica gel, or multi-component mixtures when reacted with water or water solutions.

BACKGROUND

Fuel cells are electrochemical energy conversion devices that convert an external source fuel into electrical current. Many common fuel cells use hydrogen as the fuel and oxygen (typically from air) as an oxidant. The by-product for such a fuel cell is water, making the fuel cell a very low environmental impact device for generating power.

Fuel cells compete with numerous other technologies for producing power, such as the gasoline turbine, the internal combustion engine, and the battery. A fuel cell provides a direct current (DC) voltage that can be used for numerous applications including: stationary power generation, lighting, back-up power, consumer electronics, personal mobility devices, such as electric bicycles, as well as landscaping equipment, and others. There are a wide variety of fuel cells available, each using a different chemistry to generate power. Fuel cells are usually classified according to their operating temperature and the type of electrolyte system that they utilize. One common fuel cell is the polymer exchange membrane fuel cell (PEMFC), which uses hydrogen as the fuel with oxygen (usually air) as its oxidant. It has a high power density and a low operating temperature of usually below 80° C. These fuel cells are reliable with modest packaging and system implementation requirements.

The challenge of hydrogen storage and generation has limited the wide-scale adoption of PEM fuel cells. Although molecular hydrogen has a very high energy density on a mass basis, as a gas at ambient conditions it has very low energy density by volume. The techniques employed to provide hydrogen to portable applications are widespread, including high pressure and cryogenics, but they have most often focused on chemical compounds that reliably release hydrogen gas on-demand. There are presently three broadly accepted mechanisms used to store hydrogen in materials: absorption, adsorption, and chemical reaction.

In absorptive hydrogen storage for fueling a fuel cell, hydrogen gas is absorbed directly at high pressure into the bulk of a specific crystalline material, such as a metal hydride. Most often, metal hydrides, like $MgH_2$, $NaAlH_4$, and $LaNi_5H_6$, are used to store the hydrogen gas reversibly. However, metal hydride systems suffer from poor specific energy (i.e., a low hydrogen storage to metal hydride mass ratio) and poor input/output flow characteristics. The hydrogen flow characteristics are driven by the endothermic properties of metal hydrides (the internal temperature drops when removing hydrogen and rises when recharging with hydrogen). Because of these properties, metal hydrides tend to be heavy and require complicated systems to rapidly charge and/or discharge them. For example, see U.S. Pat. No. 7,271,567 for a system designed to store and then controllably release pressurized hydrogen gas from a cartridge containing a metal hydride or some other hydrogen-based chemical fuel. This system also monitors the level of remaining hydrogen capable of being delivered to the fuel cell by measuring the temperature and/or the pressure of the metal hydride fuel itself and/or by measuring the current output of the fuel cell to estimate the amount of hydrogen consumed.

In adsorption hydrogen storage for fueling a fuel cell, molecular hydrogen is associated with the chemical fuel by either physisorption or chemisorption. Chemical hydrides, like lithium hydride (LiH), lithium aluminum hydride (LiAlH4), lithium borohydride (LiBH4), sodium hydride (NaH), sodium borohydride (NaBH4), and the like, are used to store hydrogen gas non-reversibly. Chemical hydrides produce large amounts of hydrogen gas upon its reaction with water as shown below:

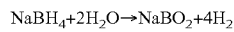
$$NaBH_4 + 2H_2O \rightarrow NaBO_2 + 4H_2$$

To reliably control the reaction of chemical hydrides with water to release hydrogen gas from a fuel storage device, a catalyst must be employed along with tight control of the water's pH. Also, the chemical hydride is often embodied in a slurry of inert stabilizing liquid to protect the hydride from early release of its hydrogen gas. The chemical hydride systems shown in U.S. Pat. Nos. 7,648,786; 7,393,369; 7,083,657; 7,052,671; 6,939,529; 6,746,496; and 6,821,499, exploit at least one, but often a plurality, of the characteristics mentioned above.

In chemical reaction methods for producing hydrogen for a fuel cell, often hydrogen storage and hydrogen release are catalyzed by a modest change in temperature or pressure of the chemical fuel. One example of this chemical system, which is catalyzed by temperature, is hydrogen generation from ammonia-borane by the following reaction:

$$NH_3BH_3 \rightarrow NH_2BH_2 + H_2 \rightarrow NHBH + H_2$$

The first reaction releases 6.1 wt. % hydrogen and occurs at approximately 120° C., while the second reaction releases another 6.5 wt. % hydrogen and occurs at approximately 160° C. These chemical reaction methods do not use water as an initiator to produce hydrogen gas, do not require a tight control of the system pH, and often do not require a separate catalyst material. However, these chemical reaction methods are plagued with system control issues often due to the common occurrence of thermal runaway. See, for example, U.S. Pat. No. 7,682,411, for a system designed to thermally initialize hydrogen generation from ammonia-borane and to protect from thermal runaway. See, for example, U.S. Pat. Nos. 7,316,788 and 7,578,992, for chemical reaction methods that employ a catalyst and a solvent to change the thermal hydrogen release conditions.

In view of the above, there is a need for an improved hydrogen generation system and method that overcomes many, or all, of the above problems or disadvantages in the prior art.

SUMMARY

The hydrogen generation system described below accomplishes a substantially complete reaction of reactant fuel material, such as a stabilized alkali metal material, including sodium silicide and/or sodium-silica gel, which do not contain any stored hydrogen gas or molecular hydrogen atoms. Additional reactants can include sodium borohydride ($NaBH_4$), and/or ammonia borane, and the like. Also, the system reaction employing these reactants does not require an additional catalyst chamber, and is easily start-stop controlled by the simple addition of an appropriate aqueous medium to satisfy the hydrogen demand of a fuel cell or hydrogen-drawing system. In addition, the examples below meet all of the above requirements while minimizing overall system volume and weight.

One example in the present disclosure is a reactor including a reactant fuel material, which generates hydrogen when the reactant fuel material is exposed to an aqueous solution. The reactor may be a standalone hydrogen generation component which can contain the aqueous solution. Similarly, another example can include a reactor to which an aqueous solution is introduced by an external supply. The hydrogen generation may also be controlled, monitored, or processed by an external control system. The control system and reactor can operate as a standalone hydrogen generation system used to provide hydrogen to hydrogen fuel cells or for any general, laboratory, industrial, or consumer use. Likewise, the control system and reactor can be implemented in whole or in part within a complete fuel cell system supplying an end product such as a laptop computer, personal or commercial electronics products, and other devices and equipment that require a power source.

One method of generating hydrogen gas includes inserting a reactant fuel material into a reactor and combining an aqueous solution with the reactant fuel material in the reactor to generate hydrogen gas.

The reactant fuel material can include stabilized alkali metal materials such as silicides, including sodium silicide powder (NaSi), and sodium-silica gel (Na-SG). The stabilized alkali metal materials can also be combined with other reactive materials, including, but not limited to, ammonia-borane with, or without, catalysts, sodium borohydride mixed with, or without, catalysts, and an array of materials and material mixtures that produce hydrogen when exposed to heat or aqueous solutions. The mixture of materials and the aqueous solutions can also include additives to control the pH of the waste products, to change the solubility of the waste products, to increase the amount of hydrogen production, to increase the rate of hydrogen production, and to control the temperature of the reaction. The aqueous solution can include water, acids, bases, alcohols, and mixtures of these solutions. Examples of the aqueous solutions can include methanol, ethanol, hydrochloric acid, acetic acid, sodium hydroxide, and the like. The aqueous solutions can also include additives, such as a coreactant that increases the amount of $H_2$ produced, a flocculant, a corrosion inhibitor, or a thermophysical additive that changes thermophysical properties of the aqueous solution. Example flocculants include calcium hydroxide, sodium silicate, and others, while corrosion inhibitors can include phosphates, borates, and others. Further, the thermophysical additive can change the temperature range of reaction, the pressure range of the reaction, and the like. Further, the additive to the aqueous solution can include mixtures of a variety of different additives.

The reactor can be a standalone, replaceable component, which enables a control system or a fuel cell system to utilize multiple reactors. The reactor may also be termed a cartridge, cylinder, can, vessel, pressure vessel, and/or enclosure. The reactor includes the reactant fuel material and either the aqueous solution inside the reactor or an inlet port, or a plurality of inlet ports, from which the aqueous solution is introduced into the reactor. The reactor can also have an output port for hydrogen gas, which may undergo additional processing (e.g., vapor condensation, purification, regulation, and the like) once it leaves the reactor and prior to being supplied to an external system, like a fuel cell.

The aqueous solution may be initially stored or added by the user externally or returned from a fuel cell system into the aqueous solution input port on the reactor. The aqueous solution can be added to the reactant fuel material, including stabilized alkali metals, in the reactor via the inlet port(s) using a pump, such as a manual pump, a battery powered pump, an externally powered pump, a spring controlled pump, and the like. The aqueous solution can be stored within the reactor and separated from the reactant fuel material by a piston, bag, membrane, or other separation device.

The reactor may have the hydrogen output and the aqueous solution input as part of one connection to one device or control system. The reactor may have the hydrogen output connected to one device or control system and the water input connected to a different device or control system. The reactor may have only a hydrogen output with internal controls combining the reactant fuel material with the aqueous solution.

The method of generating hydrogen gas can also include filtering the generated hydrogen gas, absorbing by-products in the hydrogen gas, and/or condensing water from the generated hydrogen gas. This filtration can occur inside the reactor, inside the control system, or in both. For example, a hydrogen separation membrane can be used in either the reactor or in the control system (or in both) to filter the hydrogen, while a condenser unit can be used to condense the water from the generated hydrogen gas. Filters and condensers can act upon the generated hydrogen gas as it exits the hydrogen outlet port of the reactor. The filtered hydrogen gas and/or the condensed water can be recycled back to the reactor or to a water storage container. In generating hydrogen gas, a waste product can be created, such as sodium silicate or other reaction waste products.

In one example, a control system can include a monitoring device to monitor parameters of the reaction of the reactant fuel material and the aqueous solution in the reactor. The monitoring device can monitor one or multiple parameters in or on the reactor or in an external control system. These parameters can include, but are not limited to, temperature, electrical conductivity of the reactor contents, pressure in the reactor, weight of reaction, amount of un-reacted reactant fuel material, elapsed time of reaction, amount of aqueous solution in the reactor, and a maximum amount of aqueous solution to be added to the reactor. The monitored system characteristic can then be displayed, or used in a calculation to modify the control strategy, communicate the reactor status or system status with other devices, or communicate the characteristic or a derivative characteristic to a user. An example of a user communication device is a visual display device, such as an LCD display, for example.

The reaction can be controlled in association with the monitoring device using a reaction control device. Examples of reaction control devices include, but are not limited to, devices to alter temperature, electrical conductivity range, pressure, weight of reaction, as well as other environmental measures within which the combination of the reactant fuel material and the aqueous solution in the reactor proceed. For example, reaction control devices can be used to add additional reactant fuel materials to the reactor, add additional aqueous solution to the reactor, remove a waste product from the reactor, cool the reactor, heat the reactor, mix a combination of the reactant fuel materials and the aqueous solution, bleed the reactor to decrease the pressure, and to perform other control measures.

Measuring reaction parameters and using reaction control devices allows the method of generating hydrogen gas to be controlled in the reactor when any of the environmental measures within the reactor is outside a respective range or by a control strategy that monitors and processes the rate of change of any of the parameters.

The reactor can include a number of different filters to separate the reactants and its reaction by-products from the hydrogen gas. For example, the methods of generating clean hydrogen gas can include both separating and filtering steps. In one example, at least one of the reactant fuel materials, the aqueous solution, the hydrogen gas, and/or the reaction waste products are separated from the others. Also, the hydrogen gas can be purified using a hydrogen separation membrane, a chemical filter, a desiccant filter, a coarse media filter, a dryer filter, and/or a secondary reactor chamber. As they are used, the filters can be cleaned with a portion of the aqueous solution as the aqueous solution is inputted into the reactor.

The reactor can also include structures and devices for aqueous solution distribution such as a plumbing network, nozzle arrays, flow limiters, and water distribution media such as diffusers, misters, and the like. The aqueous solution can be distributed through multiple points in the reactor in parallel, in series, or in a combination thereof. The aqueous solution distribution system can be used in whole, or in part, to react with the reactant fuel material to produce hydrogen, to purify the hydrogen stream, to clean filter media, and/or to control the waste product parameters.

The reactor can include hydrogen handling components such as a safety relief mechanism such as a relief valve, burst disc, or a controlled reactor burst point. The reactor may also include an exit flow limiter to minimize, or control, the hydrogen output rate in order to supply a required fuel cell characteristic or to match the transient flow rate limitations of the filtration components.

The system of generating hydrogen gas can also include a pressure transducer, a relief valve, a hydrogen-sealing check valve, a fan, a heat exchanger, and a reactor cooling source. Likewise, the system can include a recapture container for recycling fuel cell reaction waste solution and returning the recycled fuel cell reaction waste solution to the reactor.

The methods of generating hydrogen can also include directing a portion of the aqueous solution to areas of the reactor to recapture the waste product resulting from the combination of the reactant fuel material and the aqueous solution. For example, a portion of the aqueous solution can be added to a secondary reactor chamber, and the generated hydrogen gas can be passed through this portioned aqueous solution. Filtering can also be performed using a liquid permeable screen to separate a waste product from unreacted reactant fuel material and aqueous solution.

These and other advantages, aspects, and features will become more apparent from the following detailed description when viewed in conjunction with the accompanying drawings. Non-limiting and non-exhaustive embodiments are described with reference to the following drawings. Accordingly, the drawings and descriptions below are to be regarded as illustrative in nature, and not as restrictive.

BRIEF DESCRIPTION OF THE DRAWINGS

FIGS. 15A-15C shows an example lightweight, low-cost, reusable reactor in accordance with the claimed invention.

FIGS. 35A-B show an assembly view and a perspective view of a mating component to join a reactor and a liquid feed.

DETAILED DESCRIPTION

In the examples below, reference is made to hydrogen fuel cell systems, but it should be understood that the systems and methods discussed can also be implemented in any hydrogen gas generation application, such as laboratory applications, commercial or industrial applications, and consumer applications, for example.

Basic Hydrogen Control System

In one example, sodium silicide and/or sodium silica gel can be combined with water to generate hydrogen gas, but the developed technologies can also use other stabilized alkali metal materials, such as doped silicides and silicides that have hydrogen in association, or solid powders combined with aqueous solutions to produce hydrogen gas. Additionally, many aspects of the developed system technology can also be applied to alternative materials used in hydrogen production such as aluminum powder, or any other material, or combination of materials, that generates hydrogen when exposed to aqueous solutions.

The reactant fuel materials can be free-flowing powders or materials that are compressed, molded, cut or formed into rods, cones, spheres, cylinders or other physical geometries. The materials may consist of variable powder sizes, geometric variations, material coatings, or material variations to control the reaction rate. One method for coating would be to expose the solid sodium silicide structure to humid air creating a sodium silicate barrier which is dissolvable in water. Of course other forms and geometries for the reactant fuel materials and aqueous solutions may be used with which to combine the reactant fuel materials and aqueous solutions.

Figure 1:
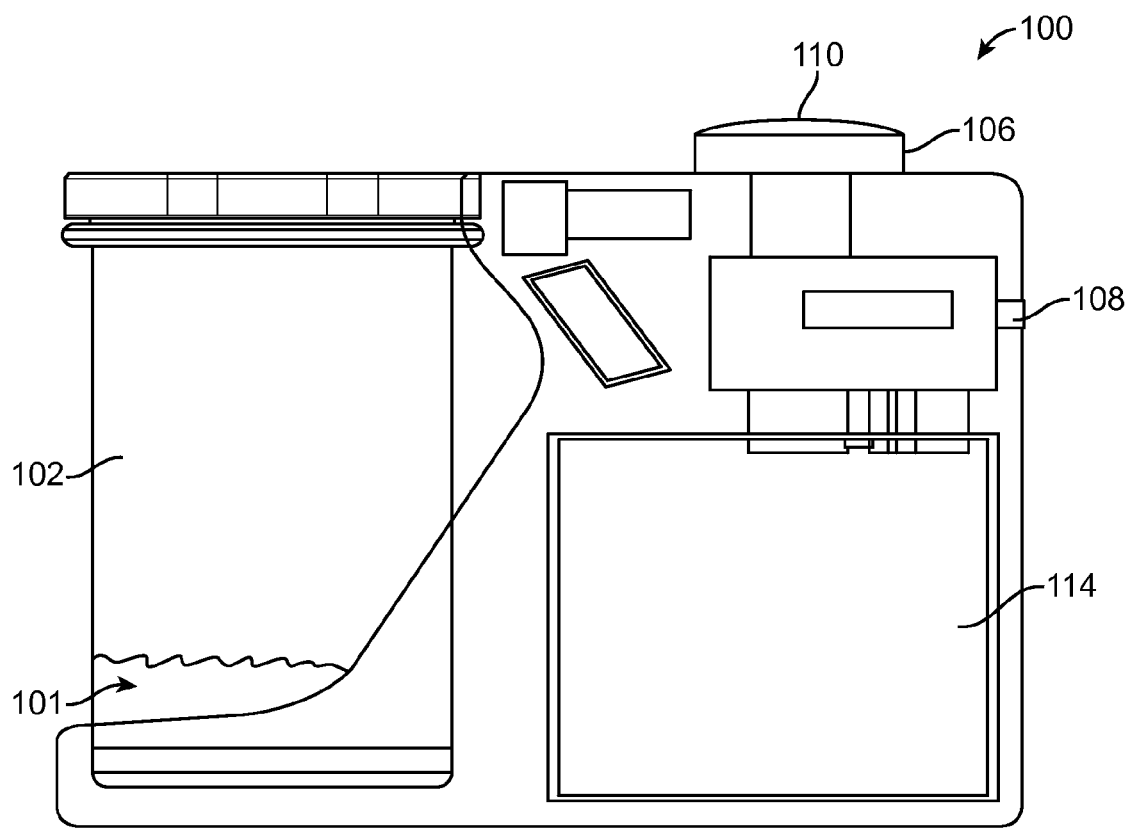
FIG. 1 shows an example of a hydrogen generation system using a stabilized alkali metal material and an aqueous solution to provide hydrogen to a hydrogen fuel cell or a general laboratory, industrial, or consumer use.

FIG. 1 shows an example of a hydrogen generation system 100 using a reactant fuel material and an aqueous solution to generate hydrogen gas. The generated hydrogen gas can be directed to a hydrogen fuel cell or to a general laboratory, industrial, or consumer use. The reactant fuel material 101 can be inserted into a reactor 102. In this disclosure, the terms reactor, cartridge, and pressure vessel are used synonymously to identify a container or other receptacle in which a reactant fuel material is placed. In the example shown in FIG. 1, a removable reactor 102 is attached to a water inlet connection 106 and a hydrogen outlet connection 108. The connections can include, but are not limited to, normally-closed double-shut-off valves and/or normally closed check valves. The connections from the reactor 102 to the water inlet connection 106 and hydrogen outlet connection 108 can be flexible connections or can be rigid connections, depending upon the particular use. Water, or another aqueous solution, is added to the reactant fuel material, such as a stabilized alkali metal 101 to generate hydrogen gas and a by-product, such as sodium silicate. The hydrogen gas moves upward and exits the reactor 102. Although a single reactor 102 is illustrated in FIG. 1, it should be understood that any number of removable or fixed reactors can be used in the exemplary hydrogen gas generation systems described. For example, in FIG. 2, two removable reactors 202, 204 are shown. Further, the reactors can be secured in place in the system using a locking mechanism, a clip, or other similar securing device.

Figure 2:
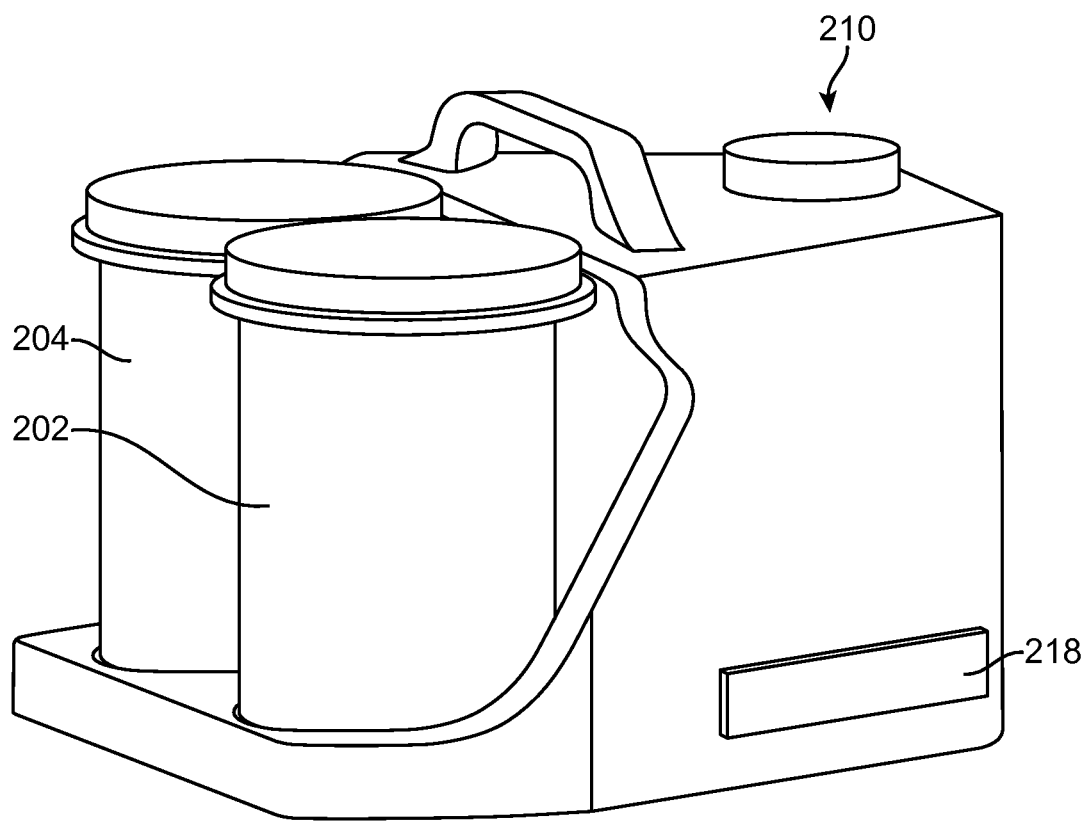
FIG. 2 illustrates an example of a hydrogen generation system with two reactors and a carry-handle accessory.

In the example shown in FIGS. 1 and 2, an aqueous solution, like water, is added to fill ports 110, 210, respectively. In another implementation, a removable water container can be used, such as water container 114, with or without a fill port. In other examples, a reactor can be pre-filled with reactant fuel material. The aqueous solution can include additives to improve reaction efficiencies, increase hydrogen production, increase the rate of hydrogen production, reduce contaminant formation, facilitate contaminant filtration, support final hydrolysis, reduce corrosion, control the pH of the waste products, change the solubility of the waste products, and extend temperature range operation, as well as affect other reaction parameters such as the thermophysical properties of the reactants. For example, the additives can include acids, bases, alcohols, other additives, and mixtures of these additives. Examples of the additives can include methanol, ethanol, hydrochloric acid, acetic acid, sodium hydroxide, calcium hydroxide, sodium silicate, phosphates, borates, and others. Other additives can be combined with the reactant fuel material, including boron, carbon, and nitrogen to improve the hydrogen capacity, kinetics and/or to reduce reaction enthalpy. With regard to temperature range operation, salt and/or other additives can be included in the aqueous solution to reduce the freezing point of the solution.

The amount of aqueous solution stored in its container can vary depending on system implementation specifics. For example, in FIG. 2, the container can store more than a sufficient volume of aqueous solution to react multiple cartridges 202, 204. The system can include a condenser (not shown) to condense water from the hydrogen output stream and either return it directly to the reactor, or direct it to the water container 114. The system can include a water inlet connection 106 for an external water source (not shown) to supply additional water to the water container 114, or in a separate implementation directly to the reactor. In one implementation, fuel cell reaction waste water can be captured in full or in part and also contribute to the water supply to reduce the net total water requirements.

For example, the sodium silicate waste product readily absorbs water, and its viscosity changes accordingly. By separating the waste product from the un-reacted reactant fuel material, the reaction can be controlled. For example, one end of the reactor can be heated or insulated to create a solubility condition where excess water exists. This water can then either be pumped back up to the stabilized alkali metal powder or allowed to react with an amount of sodium silicide configured exclusively for water usage maximization. Alternatively, at the point of reaction, the waste silicate is warm requiring little water to be in a liquid phase. At the point of reaction, a separation screen is utilized to separate the liquid waste from the unreacted reactant fuel material.

Additional System Components

Figure 3:
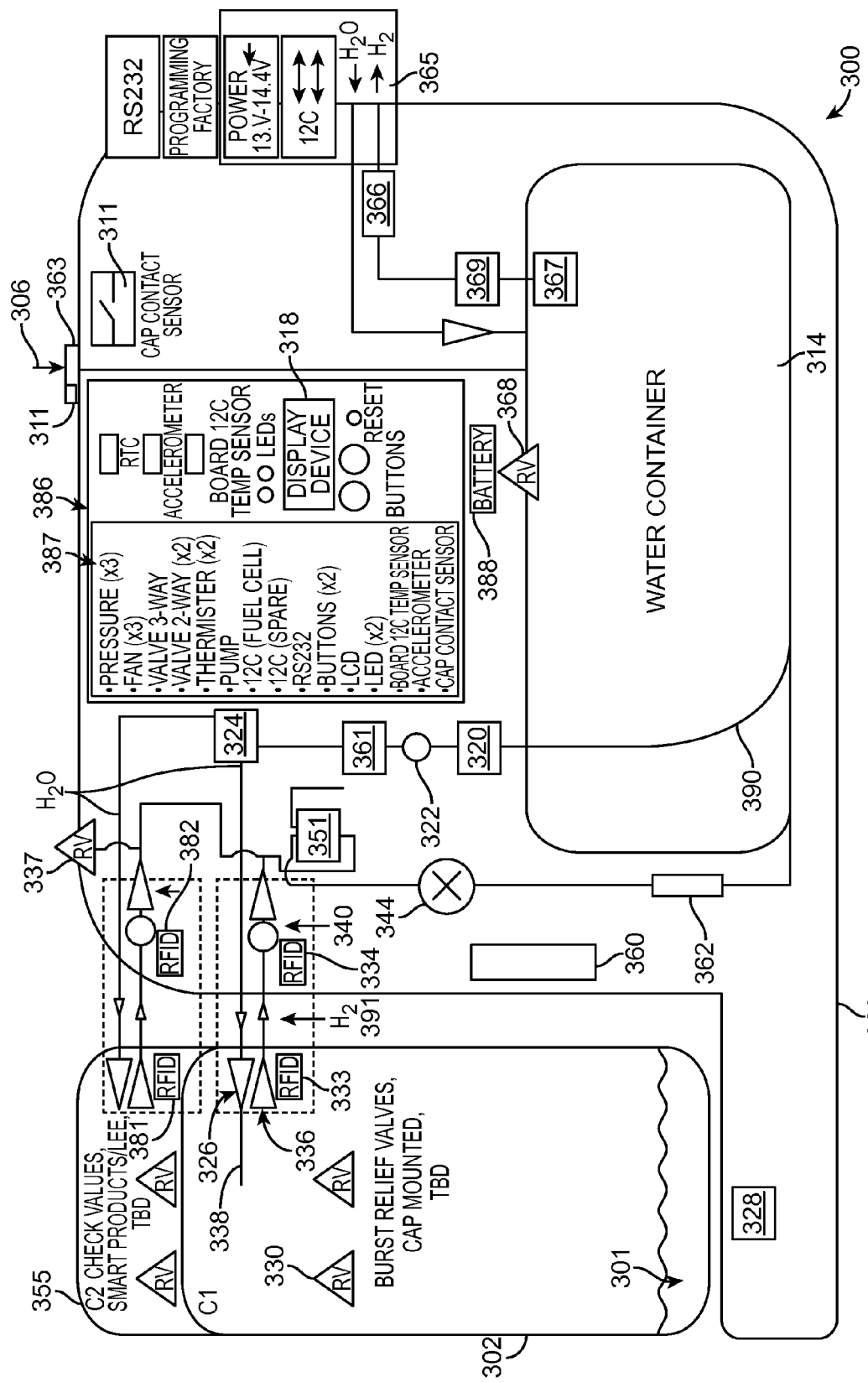
FIG. 3 shows an example hydrogen gas generation system that includes a reactor, a water container, and a number of additional components

In addition to the reactor and the aqueous solution sources, the hydrogen gas generation systems can include additional system components. For example, FIG. 3 shows an example hydrogen gas generation system 300 that includes a reactor 302, a water container 314, and a number of additional components. For example, water source inlet 306 allows the filling, or refilling, of water container 314 as needed. Water from water container 314 may be pumped into reactor 302 via water supply line 390 using a pump 320, such as a peristaltic pump, a manual pump, positive displacement pumps, and other pumps. A pressure transducer 322 may be placed in line with water supply line 390 and used to regulate the amount of water pumped into the reactor 302. For example, pressure transducer 322 may be used with a pump 320 to deliver pressure calibrated amounts of water to multiple reactors through a multiport valve 324. Pressure transducer 322 may also be used in part to provide a fail-safe mode to prevent excess water from being pumped into the reactor 302. In one example, the output voltage of pressure transducer 322 can be compared to a system voltage parameter using a comparator (not shown). The output of the comparator can be evaluated to determine if the voltage is in a proper operational range. When the voltage is in the operational range, additional circuitry implementing instructions from microcontroller 387 can drive pump 320 to provide water to the reactor 302. When the voltage is outside the operational range, the pump 320 is disabled. This circuitry can use a capacitor, or other timing circuits, to create a delay in the reading of the pump to allow an instantaneously high reading during a diaphragm pump action for example. For hydrogen generation systems with multiple reactors, a supply valve 324 can be used to select which reactor receives water.

The hydrogen gas generation system 300 can include a battery 388 to operate the pump 320 and/or to otherwise initiate the reaction and to operate other control electronics (shown collectively as 386). The hydrogen gas generation system 300 can also receive external power to either recharge the battery 388 from any external source such as a fuel cell, a wall outlet, or power from any other source. The system 300 may also include a small fuel cell system (not shown) to internally operate its internal balance-of-plant components. In one implementation, no battery is present in isolation, but rather power is obtained from a fuel cell or a fuel cell battery hybrid that is either internal to the overall system 300 or external to the hydrogen generation system 300. In one implementation, no battery is required if the reactors are given a factory over-pressure of hydrogen, which provides enough hydrogen to start the system. Furthermore, the hydrogen generation system can be designed with a small manually operated pump (such as a syringe or the like) to start the reaction by a physical user interaction rather than an electrical start.

Similar to pressure transducer 322, a check valve 326 can be used in the reactor 302, or in the control system, to keep hydrogen pressure in reactor 302 from pushing unallowably high pressures on control system components such as valves 324/361, transducer 322, and/or pumps 320. For example, as the initial water enters the reactor 302 and reacts with reactant fuel material 301 in the reactor 302, hydrogen is generated, and the hydrogen pressure in the reactor 302 builds until the hydrogen reaches a system pressure parameter value upon which the hydrogen gas is routed out of the reactor 302 and is used elsewhere. In some situations, the pressure in the reactor 302 can exceed that of the capabilities of the pump 320 and other system components. Check valve 326 can be used to prevent the pump 320, water container 314, and water line 390 from becoming excessively pressurized and to prevent damage to the system. Check valve 326 can be used to determine the pressure in the reactor 302 and to isolate the amount of pressure to the control system from the reactor 302.

Figure 34:
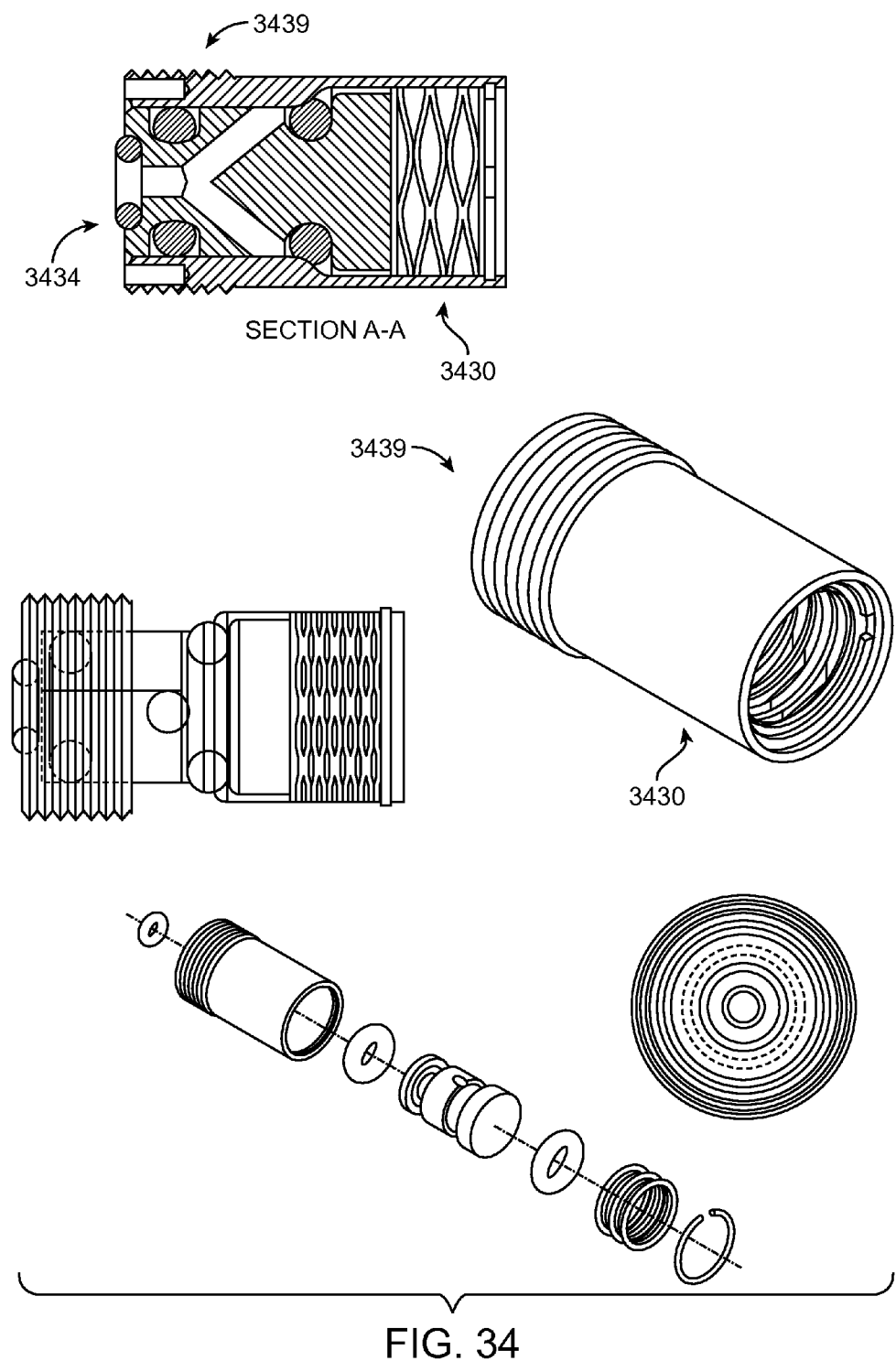
FIG. 34 shows an assembly view of a normally closed valve to separate a reactor and a liquid feed.

Similarly, hydrogen output check valves 336, 337 manage backflow in the reactor 302. Backflow may occur when the system is used at high altitudes or when the hydrogen outputs of multiple canisters are tied to each other. Check valves and transducers in each reactor, and throughout the control system, allow for independent pressure readings of each reactor for systems that use multiple reactors. The hydrogen gas output lines 391 from each reactor 302 can include a pressure transducer 340, located in the reactor 302 or in the control system 303. In one implementation, the check valve 336 only allows hydrogen to flow out of the canister as opposed to air entering the canister when being connected and disconnected, or in the event that the system is inadvertently connecting high pressure from another source to a reactor. In another implementation, this check valve 336 is not required but a normally closed check valve 3430 (as shown in FIG. 34) is used alternatively. In one implementation, check valves are connected downstream of pressure transducers 340 which allow one reactor from back-pressuring another reactor while providing independent pressure readings of each reactor with the pressure transducers residing in the control system. In other implementations, the check valves 326, 336 can physically reside in the reactor 302 or in the control system 303 and provide the same function. Additionally, the system can also include a pressure regulator 344. At times, it may be desired to operate the reactor 302 at a higher pressure (e.g., 80 psi or higher). In one example, the regulator 344 can bring the pressure down to 25 psi. Alternatively, a regulator 344 with a dial, or other means of regulating pressure, can be used, which would allow a user to change the output pressure of the control system. Alternatively, an electronically controlled regulator can be used to allow a microcontroller (such as microcontroller 387) to set the output pressure based on the desired pressure. In a separate implementation, no regulator could be used at all, and the micro-controller could control the water flow rate and amount to control the output pressure of the reactor.

Material Feeds

Alternative reactant fuel material (e.g. sodium silicide)/liquid (e.g. water) mechanisms are possible. In some configurations, the reactant material can be formed, molded, or pressed into geometrical structures. For example, rods formed from stabilized alkali metal materials can be inserted into an aqueous solution at a defined rate to control the reaction. Similarly, the rod may simply be removed from the water bath, or other aqueous solution, to stop the reaction. Additionally, reactant fuel materials can also be compressed into pellets. These pellets can then be manipulated and placed into water, or other aqueous solutions, at a defined rate to effect the reaction.

Aqueous Solution Feeds

Water may be fed into reactor 302 in a number of different ways. For example, water can be fed into the reactor using a single water inlet 338, or by using multiple water dispensing nozzles at select locations as shown in FIGS. 4A-4D. In simple system configurations and for small systems, a single water input will suffice. For larger systems, multiple water inputs can be used to facilitate the reaction and to aid in a reaction re-start. For example, in FIG. 4A, a water feed tube 411 extends vertically from water inlet 406 and employs multiple water dispensing nozzles 413 with which to feed water to multiple areas of the reactor 402 using a single tube 411. Likewise in FIG. 4B, a horizontal water dispensing filter spray 415 is also used to feed water to multiple areas of the reactor 402. In practice, a single or any number of tubes can be used. The tubes and water dispensing nozzles may be of varied sizes, and the water dispensing nozzle pattern and hole size may vary across the tube to optimize the reactor mixing conditions. For example, small tubing may be used with a number of small holes, such as holes with dimensions of 0.001" to 0.040" or larger in diameter, for example. Small holes can have a tendency to clog with reaction by-products when attempting to restart a reaction, while larger nozzles can cause the aqueous solution to dribble onto the reactant fuel material rather than jet or mist. When using a pump with high pressure capability, larger orifices can be used to inject water to the point of reaction. When low pressure water feed system are used, more nozzles can be used to limit the distance between the nozzle and points of reaction. Depending upon the application and the specific reactants, any of the aqueous solution delivery techniques can be selected.

Figure 4A:
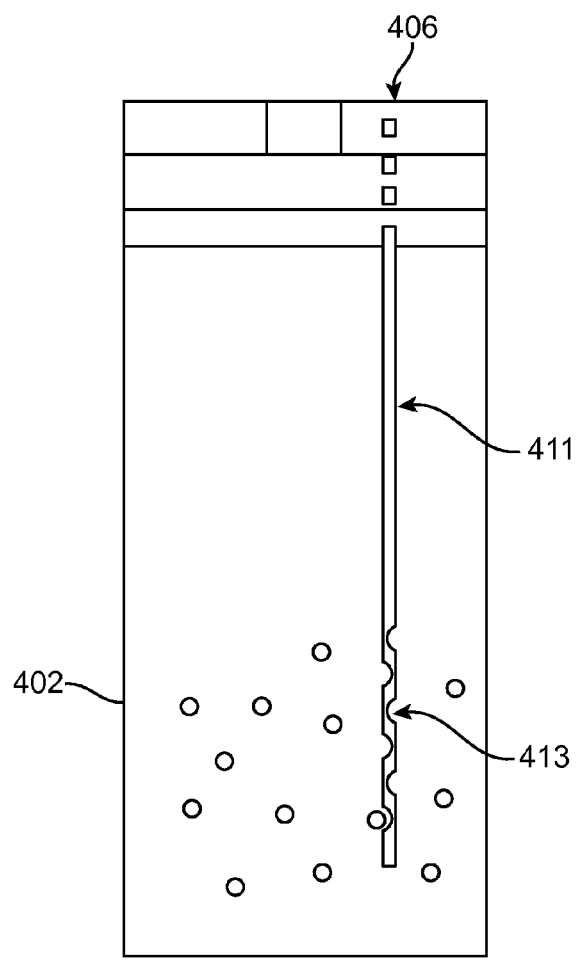
FIGS. 4A-4D illustrate reactors employing multiple water dispensing nozzles at select locations.
Figure 4B:
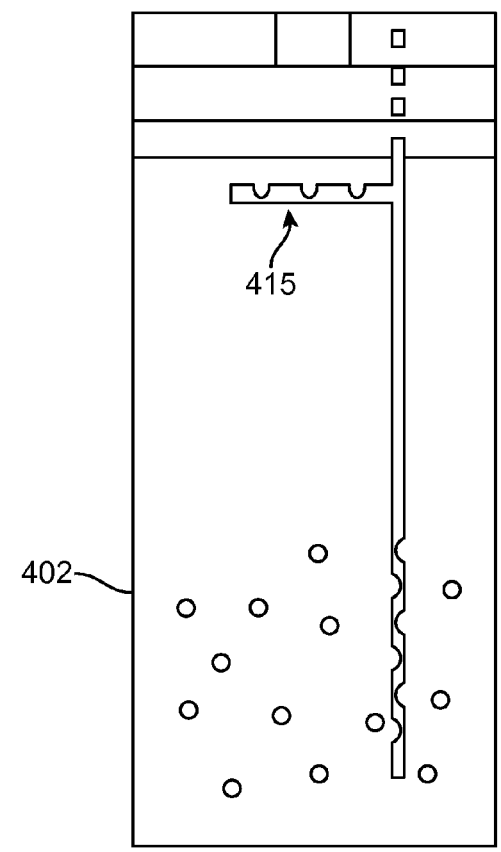
Figure 4C:
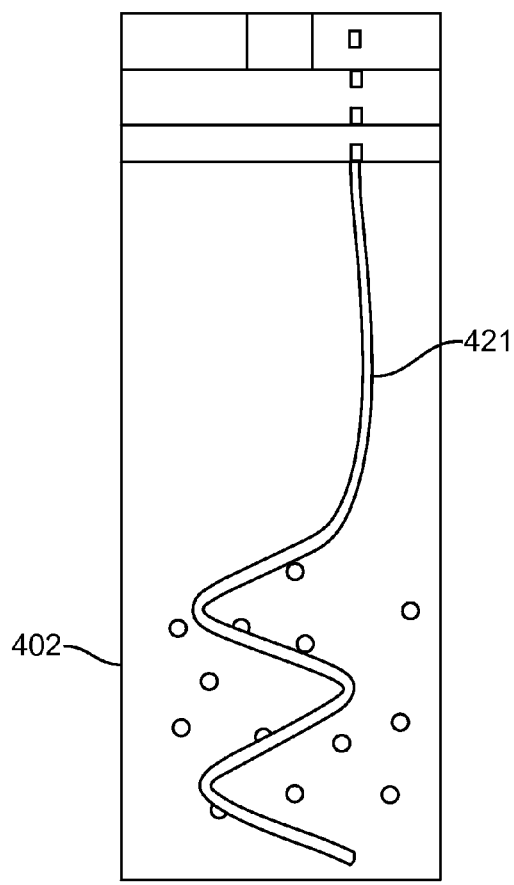
Figure 4D:
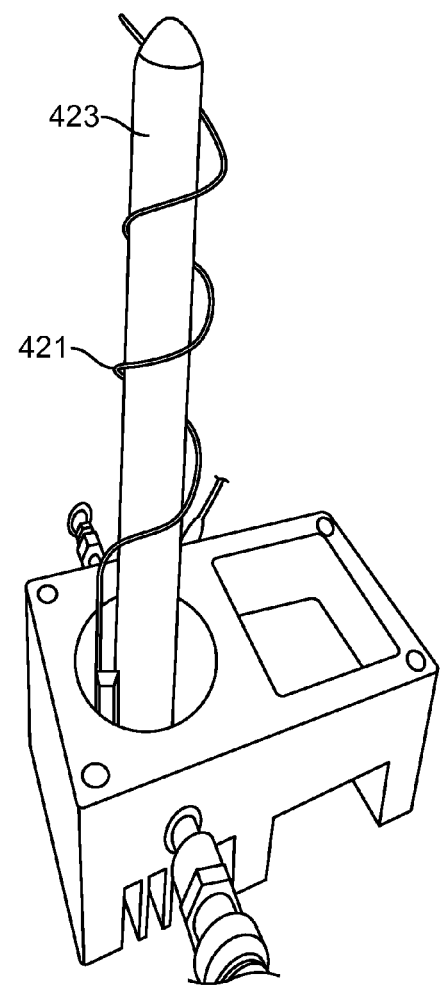

Additionally, the water feed tubes may be curved or spiraled as shown in FIGS. 4C and 4D. In FIGS. 4C and 4D, a spiral water feed tube 421 can be used to access multiple areas of the reactor 402 using a single tube. This spiral water feed tube 421 can have holes in a number of possible positions to maximize its coverage area and to minimize water saturation in one area of the reactor 402 with respect to another. The center post 423 can also be included for mechanical support and for heat removal. For designs that do not require such support or heat removal structures, it can be removed. Additionally, a water feed network can be integrated within the center post 423. Other water dispersion configurations are possible as well. For example, one implementation can employ an assortment of fine holes or mesh to facilitate water transfer. In other implementations, the water feed network may not be uniform through the volume of the canister. For example, the feed network can be optimized to feed directly into the reactant fuel area. If a reactor has an excess volume for waste products or reactant foaming, the water feed network may not add water to these areas. Additionally, the water feed network can employ tubing configured to spray water on a membrane(s) used for hydrogen separation (discussed below). The tubing can include holes or it may contain additional array(s) of tube(s) or nozzles. In this manner, water is fed directly to the reactant fuel in multiple areas of the reactor 402 to facilitate its reaction with the aqueous solution.

Figure 6:
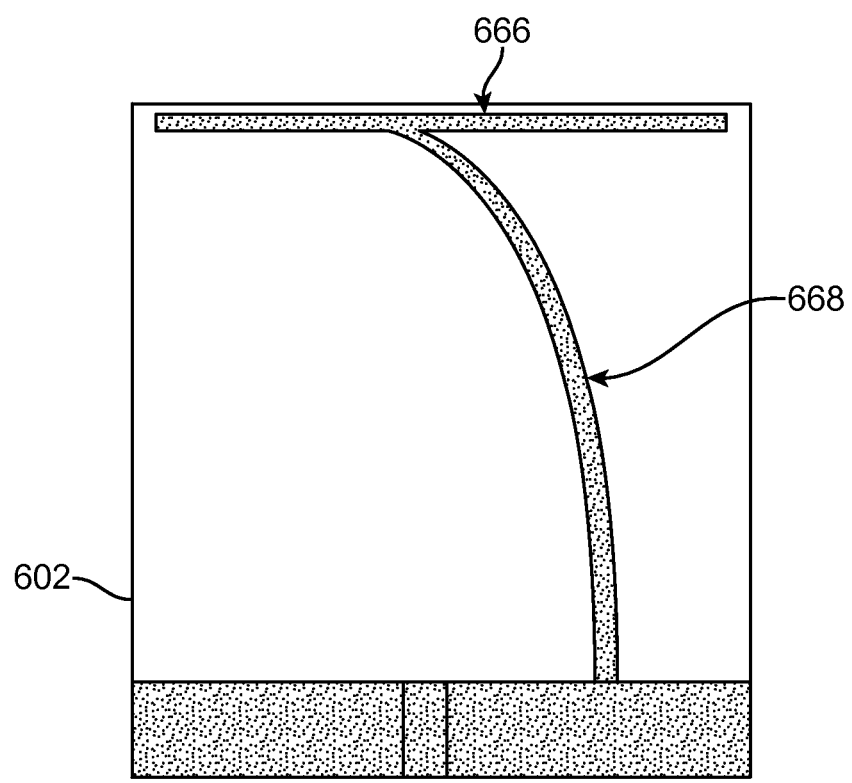
FIG. 6 shows an example hydrogen generation system with a hydrogen outlet and water inlet at one end of the reactor in a downward orientation to mix the reaction components.

By feeding water into select locations of the reactor 402, the water and ensuing reaction can be made to churn or mix the reactant fuel in the reactor 402. As hydrogen is formed and rises, the hydrogen gas serves to stir the reactor materials (that is, the aqueous solution and the reactant fuel materials) enabling near complete reactivity of these reaction components. Mixing the reaction components can also be accomplished by positioning both the hydrogen outlet and water inlet on one end of the reactor with downward orientation as shown in FIG. 6. This configuration provides a single connection plane to the hydrogen generation system. The hydrogen pickup 666 is located at the top of the reactor 602 and the pressurized gas travels to the bottom through a hydrogen tube 668. This hydrogen tube 668 can be in or outside the reactor. Different configurations and tube geometries can also be employed.

Less than complete reactivity can be employed, which may increase energy density ($H_2$ delivered/(mass of powder+mass of water required)) as the amount of water required is non-linear. In addition, partial reactivity can leave the waste product in a near solid state as it cools from the elevated local reaction temperature. Solid waste products can be beneficial for waste material disposal.

Heat Transfer

Returning to FIG. 3, as the reaction of the reactant fuel material 301 and water progress, heat is generated inside the reactor 302. One or more thermisters 328 can be used to measure the heat of the reactor 302 and to control a cooling system, including one or more cooling fans 330 that can be used to cool the reactor 302. Likewise, cooling may be provided by a liquid cooling loop (not shown) using a self-contained heat management circuit, or by circulating water about the reactor 302 from the water container 314 using a separate water cooling run. Of course, thermister 328 may also control water supply valve 324 to regulate water flowing into reactor 302 to control the reaction based upon the temperature of reactor 302, to control the amount of waste product generated, to minimize water usage, to maximize reactivity, and for other reasons.

Figure 5:
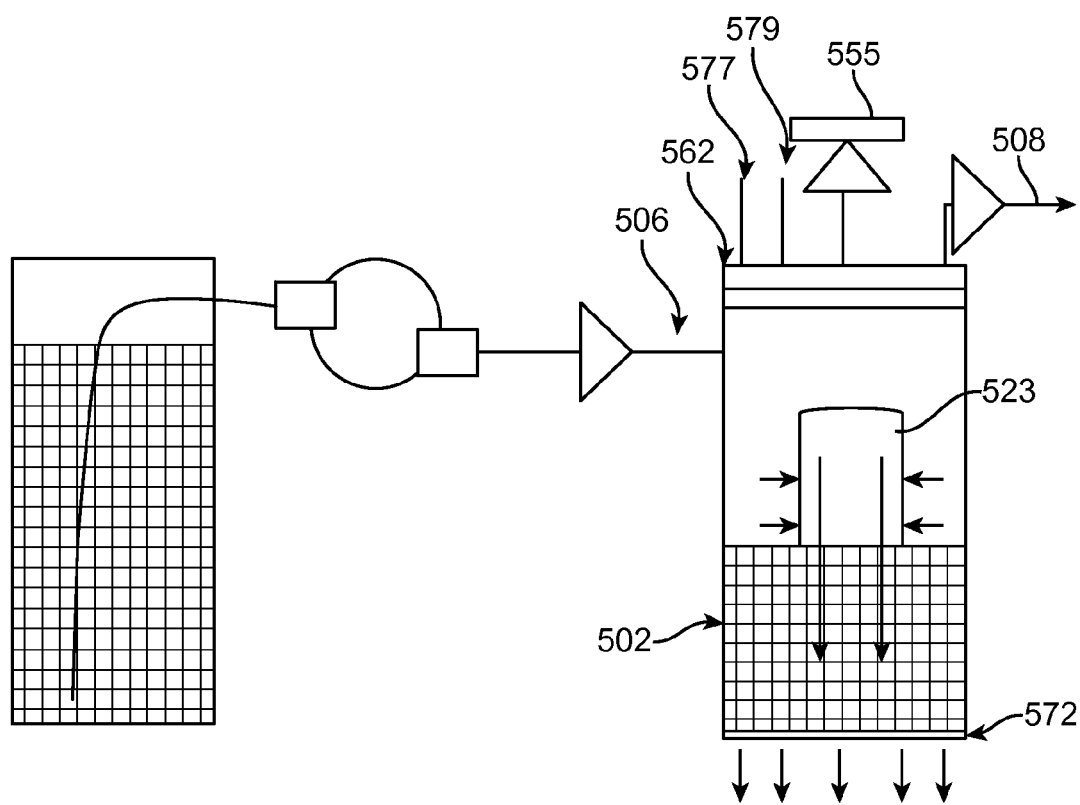
FIG. 5 schematically illustrates an example hydrogen generation system with a heat removal structure.

As shown in FIG. 5, a heat removal structure 523 can be positioned in the center of the reactor 502 as well. The heat removal structure 523 may also facilitate a mechanical reactor locking mechanism by holding both ends of the reactor together when pressurized.

In FIG. 5, the bottom 572 of the reactor also serves as a heat sink and stand for the reactor 502. While some heat is removed through the reactor walls, when these walls are clear and made from glass or plastic, these materials typically have limited thermal conductivity. In one implementation, a significant amount of heat is removed through either or both ends 562, 572 of the reactor. One end of the reactor 502 may exclusively be a heat sink (bottom 572) while the other end (top cap 562) may contain the reactor control and connections such as hydrogen connectors 508 and water connectors 506, relief valves 555, electrical connections 577, 579 such as electrical feed-thru, electrical signal processing connections, system sensing connections, and structural connections. In FIG. 5, the entire body of the reactor 502 can be clear or translucent (e.g., made of glass or plastic), providing both a feature allowing for visual detection of the status of the reaction, an estimate of reactant fuel material consumption, as well a unique packaging and visual appearance. In another implementation, the reactor can be generally opaque with a clear viewing window with which to view the reaction.

Figure 7:
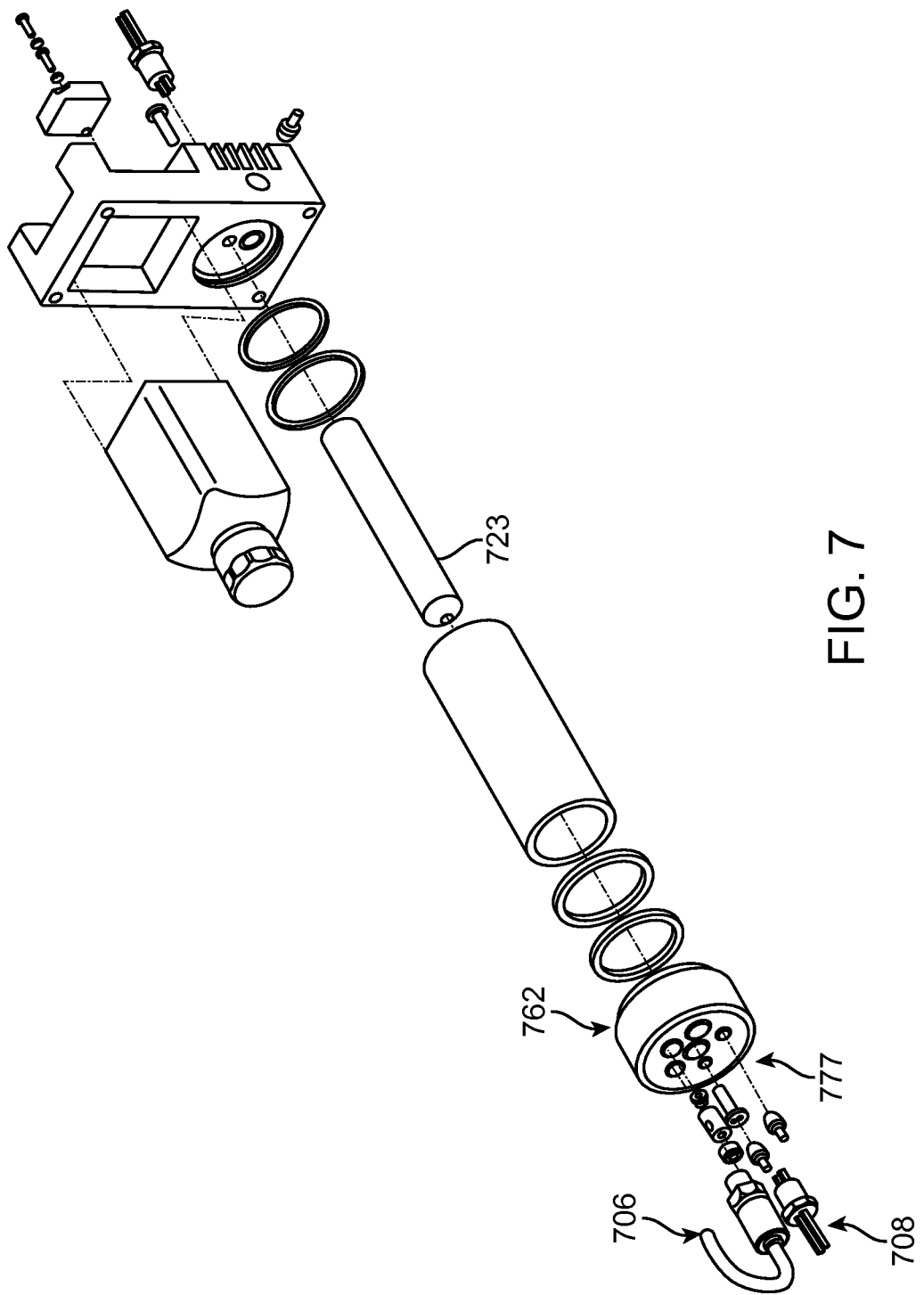
FIG. 7 shows an exploded view of a hydrogen generation system with the heat removal structure shown in FIGS. 5 and 6.

Additionally, as shown in the example of FIG. 7, the heat sink 723 and all components are connected on one end 762. This geometry facilitates easy connection to the hydrogen generation system with gas connections 708, fluid connections 706, and electrical connections 777, while providing a direct path for heat removal by the hydrogen generation system using air cooling, liquid cooling, or any other method.

Pressure Control

Returning to FIG. 3, burst relief valves, burst disks, or other controlled pressure relief points 330 can be implemented in the reactor 302 to control its pressure. For example, when the pressure in the reactor 302 reaches a predetermined system parameter, hydrogen gas could be controllably vented from the reactor 302 through a pressure relief point 330. In one example, a flow limiter can be used to limit the hydrogen output flow, to keep the flow within an allowable range for downstream devices, and/or to keep the flow within the allowable rate for successful filtration. The flow limiter can be an orifice or a function of the check valve components. A flow limiter that limits water input to the reactor can be employed to avoid excessive instantaneous pressure generation.

The hydrogen generation system 300 can be configured to operate over a range of pressures. In one implementation, a user can set the desired pressure limit, or range, using buttons, switches, or any other communications protocol (e.g., Bluetooth and the like) either directly or remotely. In one implementation, the system 300 will monitor the pressure and control the reaction accordingly to maintain that pressure in the reactor 302 within a prescribed tolerance band. The system 300 can be used for lower pressure applications (on the order of 25 psi) to facilitate user safety and operational simplicity. Many fuel cell applications operate in this pressure range. However, when necessary, sodium silicide can generate 1000's of psi for applications that require it.

Hydrogen Filtration

In one implementation, the reactant fuel material is sodium silicide, which is combined with an aqueous solution to form hydrogen gas and a by-product (such as sodium silicate) as the primary reaction. In practice, other by-products can be formed, such as silanes (e.g., $SiH_4$) when reacting under certain conditions. Borazine by-products can be formed when reacting mixtures with ammonia borane, and other items such as water vapor or sodium hydroxide (NaOH) particulates are also possible. In addition, aqueous solution (e.g., water), liquid waste product (e.g., silicate), and reactant fuel materials (e.g., sodium silicide) can all be present within the reactor. Multiple levels of filtration may be used to cause only hydrogen to exit at a level of purity applicable for the particular application.

Figure 8:
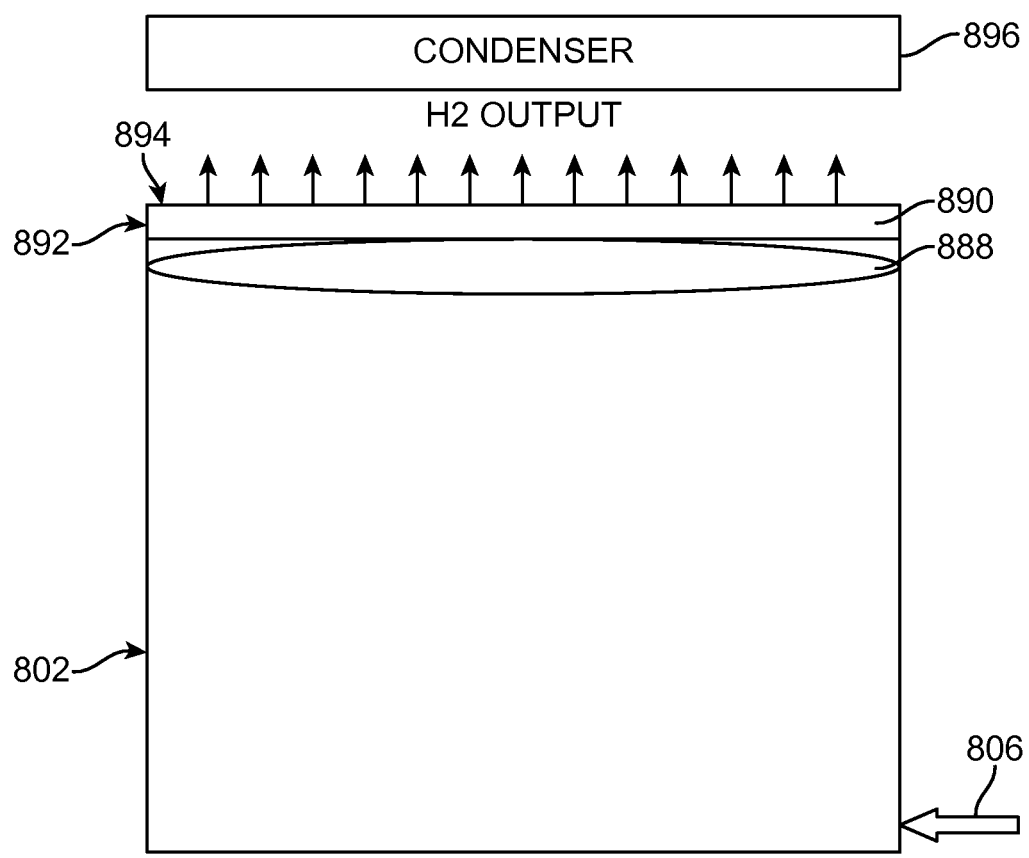
FIG. 8 shows a hydrogen generation system configuration with a coarse media filter and a hydrogen filtration membrane.

A hydrogen separator can be used which may serve multiple purposes. In one implementation, a separation media made of laminated Teflon (PTFE) with a pore size of about 0.45 micro-meters can be used. A wide variety of pore sizes and specific material choices are available. Implementation features include high throughput gas flow-rate, a water breakthrough pressure up to 30 psi, and ultrasonic bonding to the reactor cap. Membranes are available in a wide range of material types and thickness. Multiple membranes can be used to provide coarse and fine filtration. For example, when using sodium silicide as the reactant fuel material in the aqueous solution reaction, hydrogen bubbles can reside within a sodium silicate foam. During the reaction, this foam (or hydrogen coated sodium silicate bubbles) can coat a filtration membrane with a sodium silicate waste product. FIG. 8 shows a system configuration that uses a coarse media filter 888 to break down this foam prior to performing a finer filtration using a hydrogen filtration membrane 890. In one implementation, a copper wire mesh is used as the coarse media filter 888. This successfully keeps high viscosity material away from the fine filter hydrogen filtration membrane 890. Other coarse filter media can also be used. Copper, or other materials or material coatings, can be selected to include advantageous chemical activators or absorbents for either catalyzing hydrolysis or absorbing contaminants. The fine filter membrane 890 material can also include a backing 894 between the membrane 890 and the mechanical housing 892. This backing 894 provides mechanical support to the membrane 890 while providing paths for the hydrogen to exit the membrane 890 and enter the specific hydrogen output connections (not shown in FIG. 8).

By providing the coarse and fine filtration at the reactor assembly, the hydrogen gas generation system capitalizes upon volume constraints. Additional filtration within the hydrogen generator system and/or fuel cell system can also be provided. For example, the hydrogen generation systems depicted in the figures can include removable filtration devices, such as a removable desiccant filter, for example. A chemical filter can also be used in the hydrogen generator system that can be serviced after a period of time. Alternatively, the filters can be constructed of a larger size such that they do not require servicing during the full product life of the reactor. For many fuel cell applications, water vapor in the hydrogen gas output stream is acceptable due to the desired humidity requirements of the fuel cell. For other uses, such as in some laboratory environments, commercial uses, and some fuel cell applications where lower humidity is dictated, water vapor in the hydrogen gas output stream may not be acceptable, and a dryer filter can be employed. The hydrogen generation systems of the claimed invention allow for a removable filter to facilitate commercial, laboratory, and fuel cell applications, for example. In addition, some fuel cell applications, such as refilling of metal hydrides, require dry hydrogen. A water absorption media and/or condenser 896 as shown in FIG. 8 can be used in these applications as well. Any use of a condenser 896 can facilitate the collection and return of water to the primary reaction to minimize water waste from the reactor 802. The return of water to the primary reaction can be made directly to the water inlet 806 or to another connection to reactor 802.

In another implementation, the reactors can be removable or fixed, and an access door, or other access port, can be provided to add reactant fuel material and/or to remove the reaction waste once the reaction is complete. For example, an access door can be incorporated as a reactor cover, or lid, 562 as shown in FIG. 5. Alternatively, in the implementation shown in FIG. 5, any portion of the waste product can be stored within the reactor for later disposal or recycling.

Cleaning the Filters

Figure 9C:
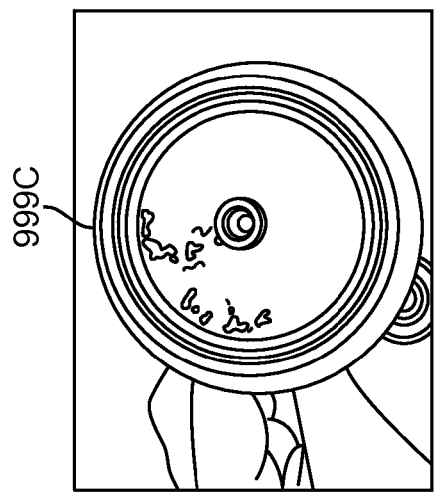
FIGS. 9A-9C illustrate a water feed network and a comparison of filter areas without a water feed network and those utilizing the water feed network.
Figure 9B:
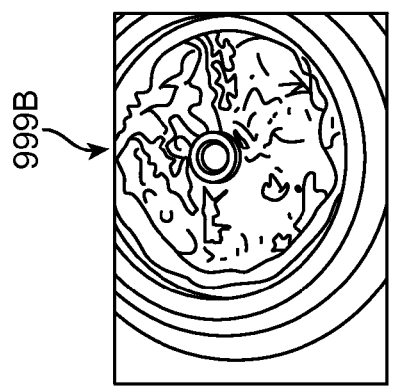
Figure 9A:
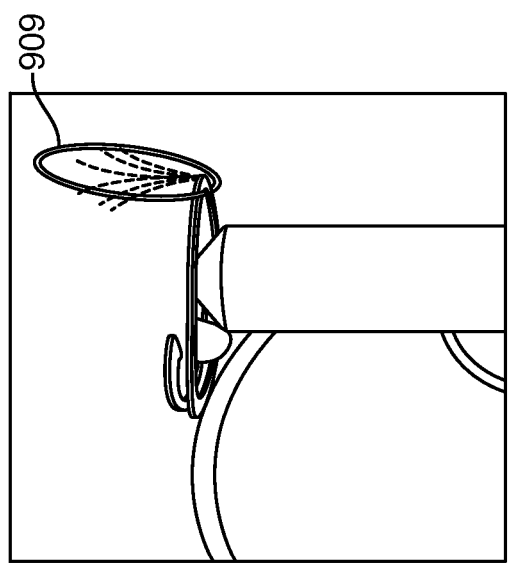

When using sodium silicide as the reactant fuel material and water as the aqueous solution in the hydrogen gas generation systems, the primary waste product is sodium silicate, which readily absorbs water. In some reactor configurations, a significant amount of sodium silicate foam causes blockage of the filtration devices over time. The highly viscous sodium silicate can clog the filtration devices. By applying water to the sodium silicate, the viscosity changes, which allows for the sodium silicate to be washed away from the filter area. For example, in one configuration shown in FIGS. 9A-9C, a section of the water feed network (such as reference numeral 338 in FIG. 3 as one example) has a portion of the water flow directed directly onto the filtration device(s), such as coarse media filter 888 and hydrogen filtration membrane 890 shown in FIG. 8. The water applied to the filtration devices by water spray 909 eventually drops back down to the un-reacted sodium silicide and is also reacted, but it first serves to clean the filter as part of its delivery to the reactor. Reference numeral 909 in FIG. 9A shows a stream of water aimed directly up to reach the filtration device. FIG. 9B shows a filtration device 999b that was not cleaned during the reaction, and FIG. 9C illustrates a filtration device 999c that was cleaned during the reaction by spraying water on the filtration device 999c. As evident from the difference in the filter residue shown in FIGS. 9B and 9C, by applying water to the filtration device, the filter does not clog.

Additional Filters

Figure 10A:
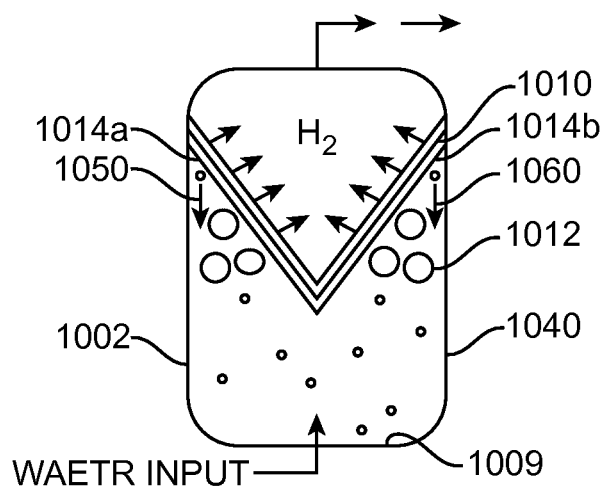
FIGS. 10A-10B illustrate alternative filter designs to membrane/coarse filter system.
Figure 10B:
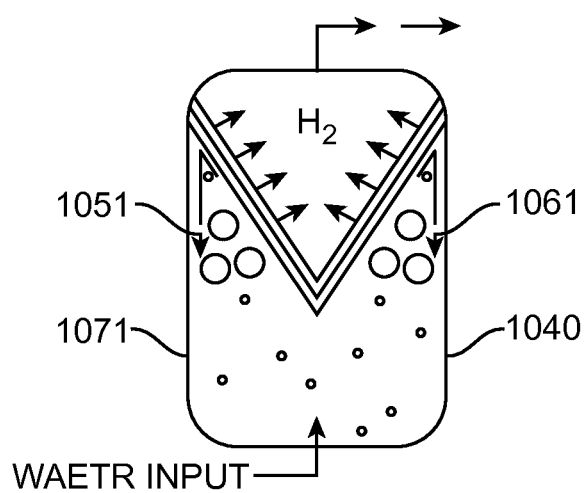

Alternative filter designs to the membrane/coarse filter assembly can also be used. FIGS. 10A-10B show a number of different filter designs. For example, in FIG. 10A, a cone shaped filter 1010 can facilitate movement of the sodium silicate foam across the filter 1010 resulting in a breakdown of the bubbles 1012. This cone-shaped filter geometry may also result in a movement of the foam to liquid collection zones in the upper corners 1014a, 1014b of the reactor 1002 and recirculation of the sodium silicate solution down to the base 1009 of reactor 1002 as shown by vertical arrows 1050, 1060 pointing downward. Additional design features may be incorporated into the reactor 1002 itself to facilitate this action. Such features can include canister cooling to facilitate condensation on the reactor walls 1040, as well as a wicking material 1071 in FIG. 10B to help move the liquid solution down the reactor walls 1040 or other appropriate areas as shown by vertical arrows 1051, 1061 pointing downward.

Multi-Chamber Reactors

Even with filtration devices described above, some amount of non-hydrogen and/or non-water can escape through the coarse filter and/or membrane. FIG. 3 shows a combination chamber 355 to facilitate a process for capturing reaction waste products, such as sodium silicate. The process of using combination chamber 355 of FIG. 3 is shown schematically in FIGS. 11A-11B using multiple filters and membranes.

Figure 11A:
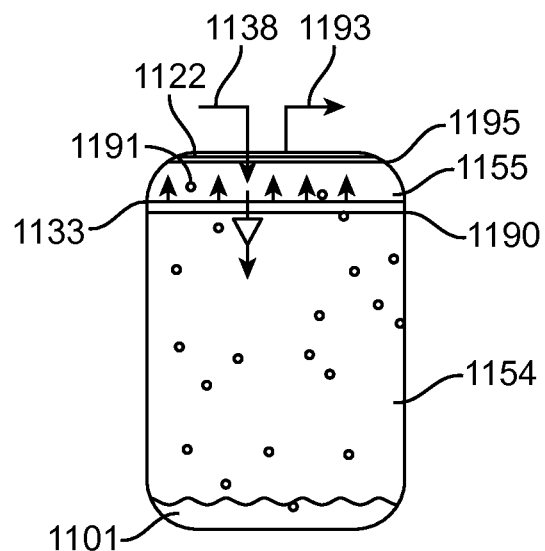
FIGS. 11A-11B illustrate systems and techniques of waste capture and circulation.
Figure 11B:
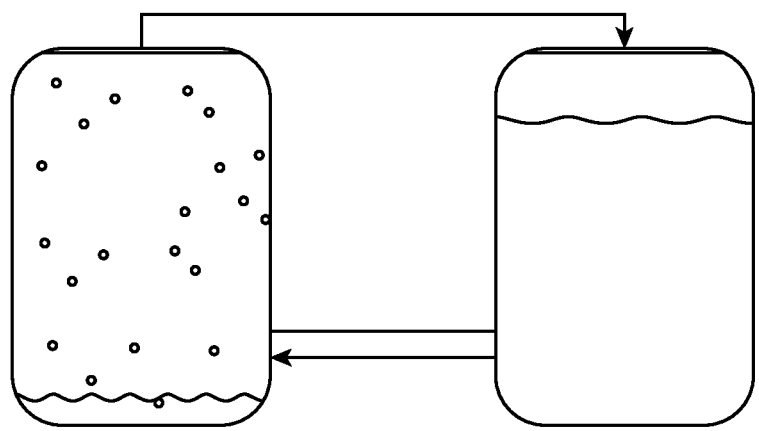

FIGS. 11A-11B illustrate methods of waste capture and circulation. In one implementation, waste capture and circulation is performed within a disposable reactor. In FIG. 11A, hydrogen gas is generated in the larger reaction chamber 1154 by reacting water and sodium silicide 1101, and hydrogen gas 1191 moves upward through the hydrogen membrane 1190. Some amount of sodium silicate, water, and other reaction products may travel through or around the membrane 1190 as well. The actual flow rate of these products is much lower than the flow rate of the incoming supply water 1138. All of these products (output hydrogen 1191, incoming water 1138, and reaction by-products) are combined into the smaller combination chamber 1155. Smaller combination chamber 1155 can be supported in reactor 1102 by supports 1133. A mesh filter 1122 can also be used to provide further incoming and outgoing filtration.

The incoming water 1138 absorbs the combined reaction by-products because they are soluble in water. The water 1138 and the by-products are then pumped back into the larger reaction chamber 1154. The output hydrogen 1191 will travel upwards to the secondary membrane 1195, which can be of a finer pore size than membrane 1190. Some amount of water vapor and other components may still be in the final output stream labeled "Pure Hydrogen Output" 1193. In some operational situations, the pressure in the combination chamber 1155 and reactor chambers 1154 may equalize, and hydrogen will not flow through the membrane 1190.

To overcome the pressure equalization, the membrane/filter pressure drops, check valve pressure drops, and specific operational control methods of the water pump can be modified prior to, or during a reaction. As an example, cycling the supply pump can create pressure perturbations allowing for hydrogen to initiate or to re-initiate flow. An alternative waste product re-capturing configuration for a pump-less configuration is shown in FIG. 11B. In FIG. 11B, an over-pressure of the supplied water is used to feed water to the reactor.

Architecture Using Smaller Compartments within the Reactor

As outlined above, the reactors in these examples can be separated into multiple compartments. This architecture can be useful for directing water to different areas of the reaction. In one example, different areas of the reaction can be operated at different times facilitating easier restart conditions as the reaction can start much quicker when just sodium silicide as opposed to when sodium silicide and sodium silicate are present. In addition, water sprayers have been shown to be effective in controlling the reactions. Each sprayer can have a defined range of water dispersion. A sprayer with a compartment approach can work well to control the reaction. Various methods and materials to separate the compartments can be used. For example, thin tubes can be loosely inserted in the reactor compartment, a honeycomb mesh assembly can be integrated in the interior of the reactor, or a flexible membrane network can be incorporated into the reactor. Additionally, the materials used to divide the reactor can seal off the aqueous solution in one compartment from other compartments. Compartments can be configured in both horizontal and vertical directions within the reactor. The compartments can also be made of water permeable and/or hydrogen permeable materials or made of other material used for water transport via surface tension forces.

Figure 12A:
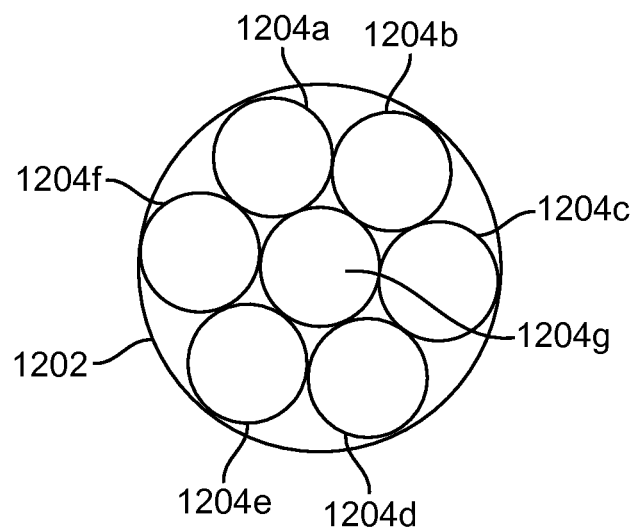
FIG. 12A illustrates an example of a reactor with multiple reaction compartments.

FIG. 12A illustrates one implementation of such an approach where a reactant fuel material can be rolled into a cigarette-like configuration. As shown in FIG. 12A, the reactant fuel material can be wrapped in a membrane material that can distribute water all around the powder and/or permeable hydrogen. Multiple rolled compartments 1204a, 1204b, 1204c, 1204d, 1204e, 1204f, 1204g, for example, can be housed within reactor 1202.

Figure 12B:
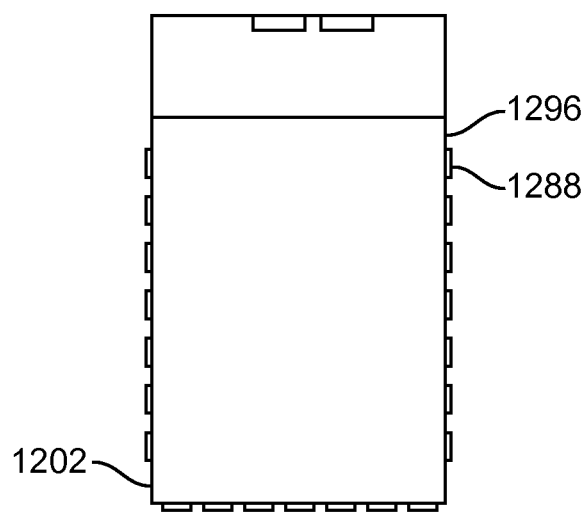
FIG. 12B illustrates an example reactor with multiple protective insulation devices.

As the reactions take place in the rolled compartments 1204a, 1204b, 1204c, 1204d, 1204e, 1204f, 1204g, the reactor 1202 will generate heat. Another implementation of such rolled compartments is to arrange the rolled compartments next to each other horizontally for a low profile package similar to a cigarette case. In addition to techniques discussed above, heat dissipation can be conducted through the walls 1296 of the reactor 1202 as shown in FIG. 12B. As the walls 1296 of the reactor 1202 get hot, a number of areas on the outside of the reactor 1202 can be insulated using protective pieces 1288 or other insulation devices. These insulation devices can be positioned on the outside of the reactor 1202 to enable a user to touch the reactor.

Determining the Status of the Reaction

After an aqueous solution is added to the reactant fuel, a reaction occurs, and hydrogen gas is generated. There are many ways to determine the status of the reaction and to verify the progress of the reaction. These techniques can include visually observing the reaction, timing the reaction, and measuring parameters of the reaction before, during, and after the reaction. For example, parameters that can be measured before, during, and after the reaction include, but are not limited to, the weight of the reactants, the temperature, the amount of aqueous solution in the reactor, the amount of reactant fuel in the reactor, the maximum amount of aqueous solution to be added to the reactor, the amount of aqueous solution added by known characterization of a pump, electrical conductivity, pressure, hydrogen output measurements either directly or indirectly by way of fuel cell current, and the like.

Figure 13:
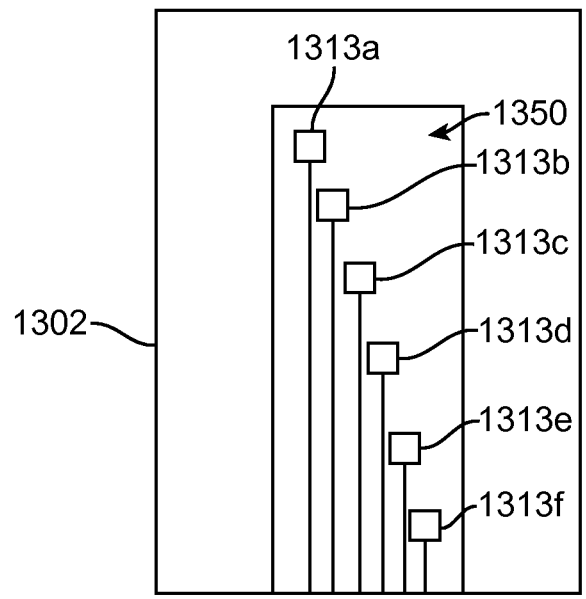
FIG. 13 illustrates an example reactor with electrical contacts to measure changes in conductivity.

For example, sodium silicide has minimal conductivity. However, once reacted with water, the sodium silicate readily conducts electricity at a level suitable for detection and measurement. While many different methods can be used to measure this change in conductivity, one implementation is shown in FIG. 13, where different electrical contacts 1366 are placed on a ribbon cable 1350 inside the reactor 1302.

The electrical conductivity measurement circuit reads and compares actual resistance measurements between pads 1313*a*, 1313*b*, 1313*c*, 1313*d*, 1313*e*, 1313*f* and/or looks for point-to-point conductivity between pads 1313*a*, 1313*b*, 1313*c*, 1313*d*, 1313*e*, 1313*f*. These measurements can be made using as few as two pads or as many pads as required to provide sufficient state-of-reaction resolution. Similarly, contact probes can be placed in different locations of the reactor to perform similar readings and accomplish a similar effect.

Further, in another example, a single probe can contact two electrical tips to measure the resistance at a particular point at a very specific distance in the reactor. This technique can be used in a configuration where an electrically conductive reactor is employed. In a similar implementation, a single probe, multiple probes, or conductive pads may be used, and the reactor itself can be used as a measurement ground.

Figure 14:
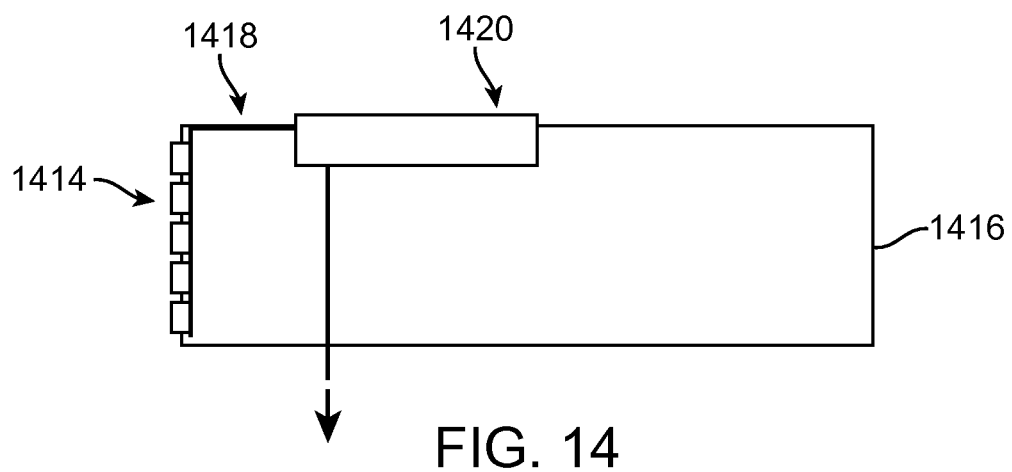
FIG. 14 illustrates an example reactor with electrical contacts connected to a pressure vessel cap of the reactor.

In one configuration, the electrical contacts are connected to the hydrogen generation system via a number of electrical contact methods, such as spring loaded contact pins, swiping pins, blade insertion devices, wireless transmission, or any other method of electrical signal transfer. One reactor example using such contacts is shown in FIG. 14 where electrical contacts 1414 connect to the pressure vessel cap 1416 of a reactor. A recessed ribbon cable 1418 connects the contacts 1414 to a microcontroller 1420 in the pressure vessel cap 1416. The hydrogen generation system can include detection circuitry effected by programming instructions in the microcontroller 1420 to interrogate or probe the contacts 1414, to measure the resistance, and/or to determine a short circuit and/or an open circuit. The microcontroller 1420 can include programming instructions and algorithms to interrogate the contacts 1414, determine a signal level, and convert the signal level to a conductivity measurement and to equate the conductivity measurement to a status of reaction measurement. Of course, the microcontroller can reside on the reactor assembly (such as in the pressure vessel cap 1416 in FIG. 14) or in the control system 303 as shown in FIG. 3.

In another example for determining the state of the reaction, a force sensor, such as a strain gauge, can be used to measure the weight of the reactor. Over the state of the reaction, the reactor becomes heavier due to the water added to the sodium silicide. The change in weight of the reactor can be measured using a scale or other force sensor to determine the weight of reaction before, during, and after. By weighing the reactor during these periods, the status of the reaction can be determined as well as other system specific parameters such as reaction efficiency, completion percentage, a time of reaction, the amount o hydrogen gas generated from the reaction, and other parameters.

The control system can adjust its pump parameters based on the state of reaction. For example, reactions can require more water to generate the same amount of hydrogen near the end of the reaction than the beginning. The microcontroller can use this system parameter to predict the reaction characteristics enabling more uniform hydrogen generation by adjusting other control measures, such as temperature ranges, pressure ranges, and the amount and speed at which the aqueous solution is added to the reaction.

Displaying Reaction Status and Reaction Parameters

Regardless of the measurements used to determine the status of the reaction, as shown in FIG. 2, display devices 218 may be used to monitor and control the reaction of the reactant fuel and the aqueous solution. Display device 218 can include an LCD (liquid crystal display) or other displays to show the determined force or weight of reaction and other operating or system specific parameters. An additional example display device 318 is shown in FIG. 3. For example, the display device 318 can display the actual weight, or use a microcontroller (such as microcontroller 387 in FIG. 3) to convert the actual weight to a completion percentage, a time, or to another measure related to the status of the reaction.

Single Compartment Reactor Example

An example lightweight, low-cost, reusable reactor 1502 is shown schematically in FIG. 15A and in detail in FIG. 15B. The thin-walled reactor 1502 is stamped and formed to include a lip 1553 around the canister cap 1555. A separate support piece 1557 is placed on the underside of the lip 1553. The canister cap 1555 and support piece 1557 compress the lip 1553, facilitating a strong reactor 1502 while using a very thin walled canister that all can be disassembled and re-used. The lip 1553 facilitates a mechanical connection to secure the canister cap 1555 using a retaining ring without gluing or crimping. This provides the capability of removing the canister cap 1555, servicing the reactor 1502 and cap 1555, then refilling and reusing the reactor 1502 and cap 1555. Servicing the reactor 1502 and cap 1555 can include replacing or refurbishing component pieces, such as separator membranes, filtration media, and the like. Additionally, protective methods, such as encapsulation or other methods, can be used to avoid tampering with the reactor and/or to provide reactor tampering detection.

Figure 15C:
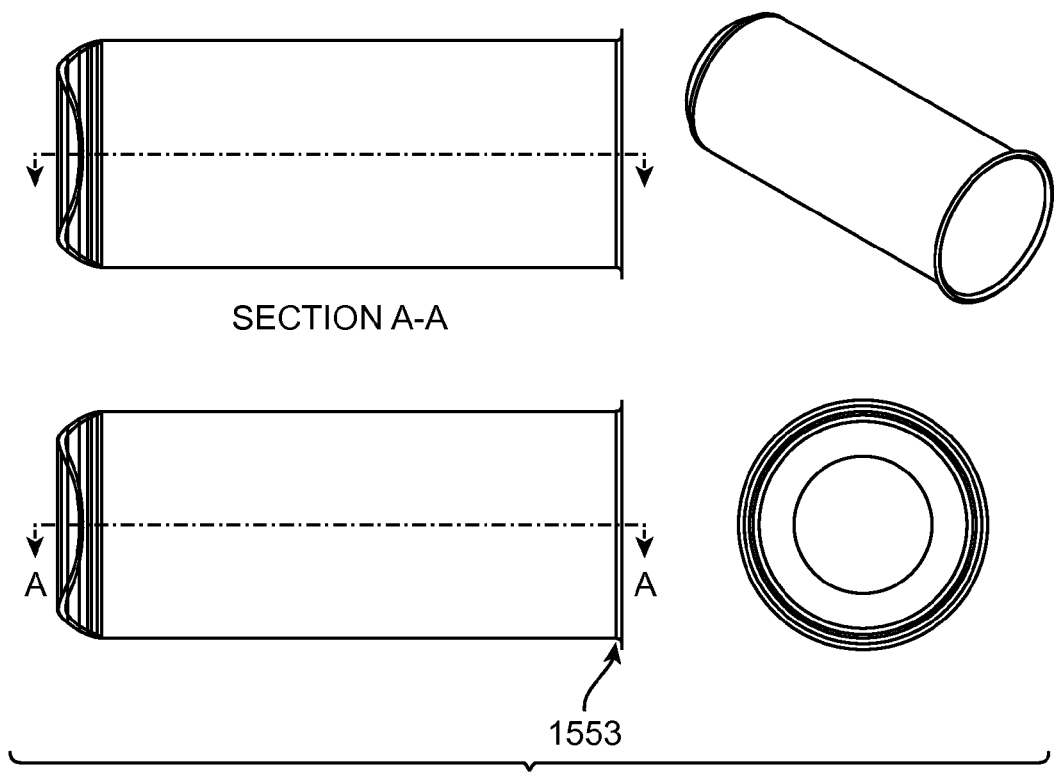

FIG. 15C shows a detailed drawing used in the manufacturing of such a thin-walled vessel including the designed over-lip 1553. As also shown in FIG. 15B, the over-lip 1553 can be omitted if other methods are used to attach the reactor cap 1555, such as crimp or glue-on approaches. The bottom section 1563 of the cap 1555 can be designed to minimize weight and maximize strength while providing practical connection devices (collectively shown as 1565) such as aqueous solution inputs, hydrogen gas inputs and outputs, electrical connection devices, and the like.

As further shown in FIG. 15B and described operationally above with regard to FIG. 3, the reactor 1502 includes both a hydrogen exit 1544 and water inlet 1591. These connections may contain check valves and/or normally closed shut-off valves, or other devices to regulate water and hydrogen flow. An example of a normally closed shut-off valve 3434 is shown in FIG. 34. The normally closed shut-off valve 3434 can be installed in the reactor on either the hydrogen exit 1544 and/or the water inlet 1591 as shown in FIG. 15B. A mating component 3535 shown in FIG. 35 is mounted on the control system and has an o-ring 3537 or over-molded gasket on the surface of the mating component 3535, which touches and depresses on the surface of the normally closed shut-off valve 3434. As the surface of mating component 3535 depresses on the valve assembly 3434, the inner portion of shut-off valve 3434 slides to provide an open fluid channel. In the un-opened state, the spring 3430 pushes on the body of valve 3434 and causes an o-ring to seal and allow liquid to flow. An additional o-ring is used as a dynamic seal, which keeps the valve void volume to a minimum, which significantly reduces the amount of normal air added to the hydrogen gas when being connected and disconnected. The body of valve 3434 includes threads 3439 so the body may be screwed into the canister cap 1555. The valve 3434 can be installed and held in place by many other mechanisms such as by glue, press-fit, snap-ring, and the like.

The reactor shown includes integrated safety relief valves 1538 and 1588. The safety relief valve 1538, 1588 can be implemented in alternative methods such as a one-time controlled pressure relief burst point. In FIG. 15B, one relief valve 1538 is used to vent pressure through the filtration while another relief valve 1588 may be used to vent pressure prior to filtration. In one implementation both valves 1538, 1588 are set to relieve at the same pressure. In another implementation, the post filter valve 1538 is set to relieve at a lower pressure than a pre-filter valve 1588. In the event of an unattended high pressure event, the system will vent all of the high pressure hydrogen through a filtered output. The secondary valve 1588 can also serve as a backup valve in the event of a high pressure event where the filter is clogged. In another implementation, a dip tube 1543 is connected to the gas channel of the relief valve 1588 and directed to the bottom of the canister to vent the canister if stored upside down. In a version of this implementation, the dip tube 1543 can contain porous filter media at the top, bottom, or both to selectively vent hydrogen versus sodium silicate or other aqueous solution elements.

The cap 1555 includes an RFID chip 1522, such as an Atmel TK5551 RFID chip, for example. Three thin-walled tubes 1539, 1541, 1543 are shown within the reactor 1502. One tube 1539 brings down water from the center of reactor 1502 and includes integrated nozzles 1549a, 1549b, 1549c to direct water flow to the areas of the reactor 1502 in which the reactant fuel is present. Another tube 1541 is horizontal to the plane of top cap 1561. This tube 1541 sweeps around the filter 1561 and sprays water across the filter 1561 to clean the filter 1561 and to further the reaction between the aqueous solution and the reactant fuel.

As discussed above with regard to FIG. 3, a check valve (not shown in FIG. 15) can be placed in line with the water line in the reactor 1502. As described above, the check valve can be located in the control system, in the reactor 1502, or in both. Water is pumped into the reactor 1502 through the previously described water network. As hydrogen exits the reactor 1502 via hydrogen exit 1591, the hydrogen gas can be passed through a check valve (not shown in FIG. 15) as well. As indicated above, the hydrogen gas output check valve can also be located in the control system (shown in FIG. 3 as reference numeral 303), in the reactor 1502, or in both. In systems utilizing more than a single reactor 1502, a check valve is used for each of the hydrogen exit lines from each reactor. Also, independent pressure transducers can be used to measure each reactor pressure separately, and the independent pressure transducers are then connected to the hydrogen exit lines either in the reactors or in the control system but prior to at least one check valve or other downstream isolation mechanism. Check valves can be used to prevent one reactor from back-pressuring another. Other components, such as normally closed valves or flow control regulators, can be used to accomplish similar results.

As described above with regard to FIG. 3, hydrogen gas can pass directly out of reactor 302. In another implementation, the hydrogen gas can first pass through a high purity contamination filter. Similarly, as shown again in FIG. 3, the hydrogen output can be bubbled through a water tank/condenser, such as the original water tank 314 or a separate water tank. This serves to condense some amount of water vapor and to capture some amount of particulates or contaminants that may be present in the outputted hydrogen gas.

After bubbling through the water tank 314, the outputted hydrogen gas can be passed through a fine high purity filter 369. The water tank 314 can include additives for low temperature operation or for other purposes. Additives can include a coreactant that increases the amount of $H_2$ produced, a flocculant, a corrosion inhibitor, or a thermophysical additive that changes thermophysical properties of the aqueous solution. For example, the thermophysical additive can change the temperature range of reaction, the pressure range of the reaction, and the like. Further, the additive to the aqueous solution can include mixtures of a variety of different additives.

Some additives can facilitate less contamination in the outputted hydrogen stream, or the additive itself can serve to do hydrolysis on any developed silane ($SiH_4$) produced in the reaction. Hydrogen gas from reactor 302 can be directed to an aqueous filter 351. A pressure transducer 340 can be used to measure and regulate the pressure of the hydrogen gas. An aqueous filter 351 is used to perform hydrolysis on any developed silane, collect particulates, and condense water from the hydrogen output stream. In the event of hydrolysis of silane, a small amount of $SiO_2$ and hydrogen would be generated. The produced hydrogen can be used in the hydrogen gas output 365 and the $SiO_2$ can be pumped into the reactor 302 with the remaining water through valves 361, 324. The water tank 314 can be drained and cleaned as necessary. If bubbling outputted hydrogen through water, the water tank 314 can also have a permeable membrane 367 in the top to allow hydrogen to exit at hydrogen exit port 365, but not allow water to exit in a severe tilt or flipped upside down situation. In one implementation, the water lid 363 has a cap contact sensor 311 or other detector that notifies the micro-controller 387 once the water lid 363 is fully closed. In one implementation, the microcontroller 387 can turn off an output valve 362 before the water tank 314 to let the reactor(s) stay pressurized while more water is added.

In other examples, an output valve 366 can be placed after the exit of the water tank 314 and the fine filter 367. This output valve 366 is can be controlled by the micro-controller 387 to start the reaction and allow the pressure to build to an appropriate level to supply the outputted hydrogen gas to an end application, such as a cell phone, a laptop computer, a residential electrical grid, and the like. Another example includes a separate relief valve 368 or a bleeder valve to purge the system of any trapped air. As discussed above, a further example includes a filter 369, such as a condenser or desiccant filter, in line with the output hydrogen line to support particular application requirements as applicable.

Another example can include routing all water from reactor 302 through a secondary combination chamber 351.

Additionally, another example includes pumping input water into secondary combination chamber 351 as a direct pass on its way to the reactor 302 or with independent control to the secondary combination chamber 351. The secondary combination chamber 351 can be coupled to the thermal control system, including thermister 328 in order to increase and/or maintain the temperature of the secondary chamber in order to facilitate hydrolysis and/or filtration, much as thermal control was provided with regard to the reactor 302 as described above.

Additional Electrical Connections

In both single compartment reactors and those reactors with additional compartments, additional electrical connections can be made to provide addition information to a user regarding the status of the reaction and the system specific parameters. For example in FIG. 3, additional signal connections (either wired or wireless) can be made from reactor 302 and control system 303 to control electronics 386 to provide control devices and display devices measurement data with which to monitor and display system specific parameters.

For example, one or more read/write RFID devices can be used to assess the state of the reaction by storing and reporting system specific parameters. For example, microcontroller 387 can write data indicative of the amount of water pumped into the reactor 302 to an RFID device 333, which could be placed in a cap of reactor 302. Based on the amount of measured water known to be inserted into the reactor 302 and with other measurements such as pressure and temperature measurements, the state-of-reaction can be determined by the system 300. Similarly, additional RFID devices 381, 382, 334 can be incorporated throughout the reactor 302 and control system 303 to provide and store system information to and from microcontroller 387. For example, each RFID device can include information such as a serial number, an amount of water inserted into the reactor, the total allowable amount of water that can be inserted into the reactor, the pressure in the reactor, the pressure in the water container and elsewhere in the system. The pressure measurements, temperature measurements, amounts of water, and other system characteristics in the RFID devices can then be used to determine the state of the reaction. Similarly, microcontroller 387 can write other system parameters, such as the water flow velocity, amount of hydrogen produced, and other parameters to RFID devices 333, 334, 381, 382 and other RFID devices that can be placed in control system 303, in reactor 302 and throughout the reaction devices.

Additionally, an RFID device (not shown separately) can be integrated into the reactor 302 to provide inventory management by individually identifying the reactor 302. This device can be used separately for inventory management, or a single device can be used in conjunction with multiple set of control functions. The RFID devices can communicate with a transponder and/or a number of transponders that can be used in multiple locations. For example, transponders can be used at a factory manufacturing reactors as part of an assembly line or as a hand-held device for quality control. Likewise, transponders can be located in mating hardware for use in the field. The mating hardware can include a hydrogen generation system, a fuel cell system, a complete power system, or other interface system.

Passive Hydrogen Generation

Figure 16:
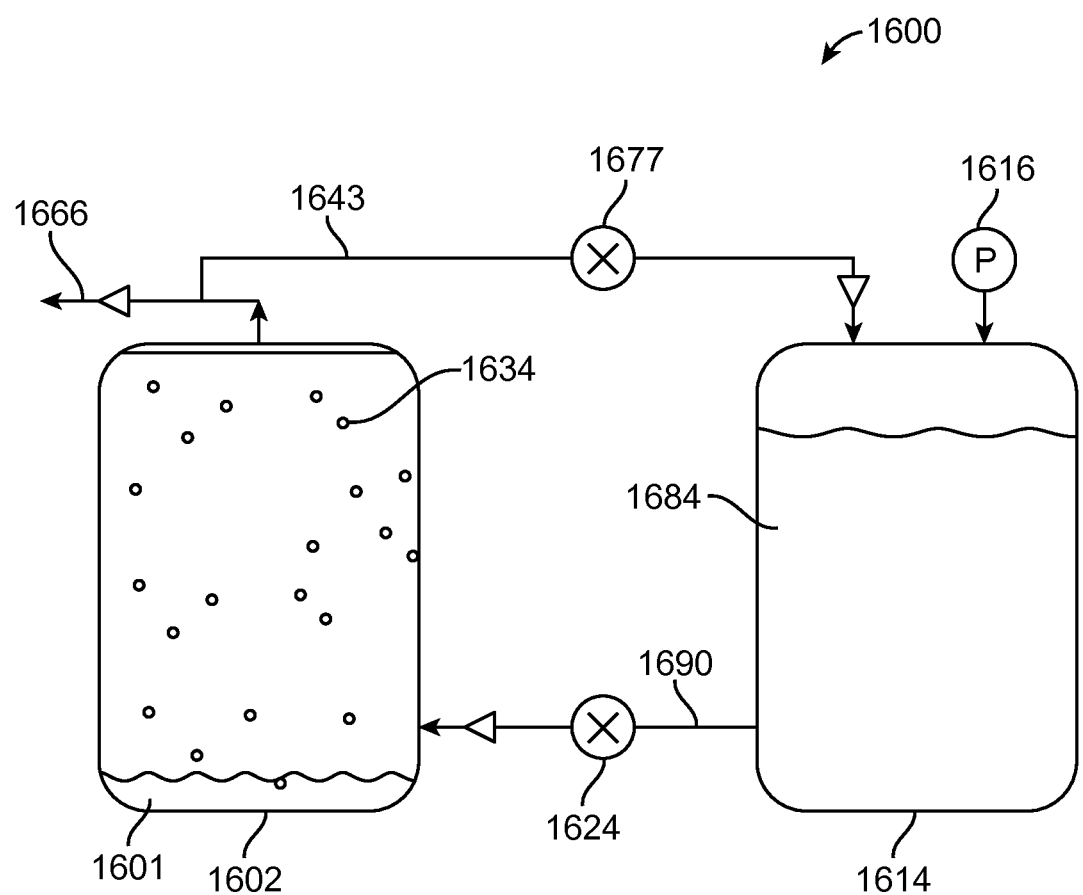
FIG. 16 shows an example architecture of a low output reactor system in accordance with the claimed invention.

An example of a passive architecture reactor system 1600 is shown in FIG. 16. "Passive architecture" refers to the lack of an electrical pump to initiate the reaction. Passive architecture systems are often suitable for low output systems. With this architecture, overhead operations can be minimized. For example, components of low output systems can often be combined into smaller numbers of physical packages, and other components can be eliminated altogether. For example, the fan and pump of a reactor system can be eliminated for a low-power system such as a cell phone or a cell phone recharger and other applications where low power is required and both the volume and cost must be minimized. A simplified architecture of a pump-less system for sodium silicide based (or other aqueous reactive material) hydrogen generation is shown in FIG. 16. The water tank 1614 is initially pressurized by either connecting a pressurized source 1616 or a pump. Water is then fed through the water supply line 1690 which can also include a flow-limiter 1624. The flow-limiter 1624 can be an active component, such as a valve, or a passive component, such as an orifice. Alternatively, gravity itself may provide the initial force to move water through the water supply line 1690. As the initial water enters the reactor 1602 and combines with the sodium silicide 1601, hydrogen 1634 is generated and creates hydrogen pressure, which in turn re-pressurizes the water supply 1684 via re-pressurization line 1643. The pressure at the hydrogen output 1666 will drop as hydrogen begins to flow out of the system and back to water tank 1614. However, the pressure at the water tank 1614 is maintained due to the check valve 1677. This creates a pressure differential driving more water into the reactor 1602, which then re-pressurizes the system 1600. As the pressure increases, the total system pressure balances, which stops the water flow. Flow-limiter 1624 can be used to control the rate of water input to reactor 1602. Otherwise, excess water could be inserted into the reactor 1602 before the hydrogen pressure has had time to develop, which could potentially lead to a positive feedback situation, and the reaction would occur prematurely.

In addition, the water supply may come from either the bottom of the water tank 1614 or through another exit point (such as the top) on the tank 1614 when a water pick-up line is used (not shown in FIG. 16). Gravity or siphoning water feed mechanisms can also be incorporated into the system by appropriate placing of the water inlet and exits.

Figure 17:
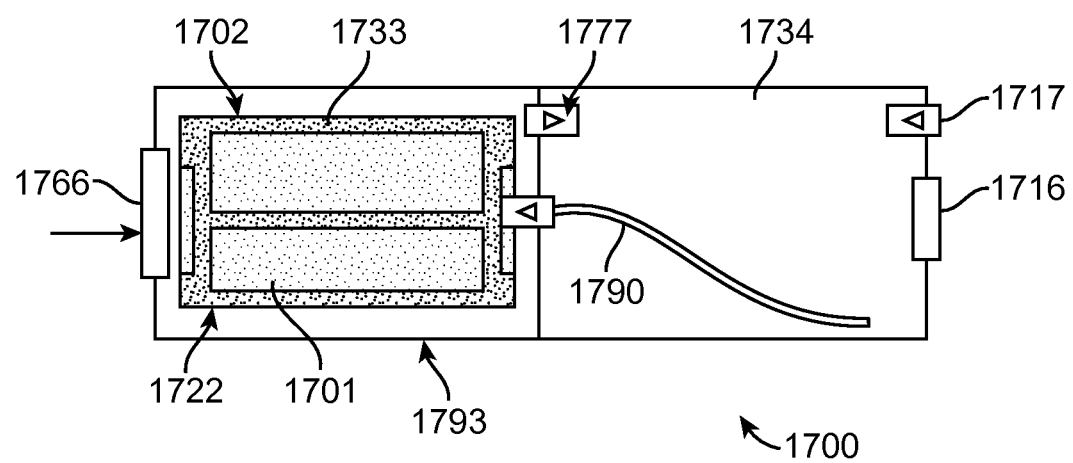
FIG. 17 shows a detailed example of a low output reactor system in accordance with the claimed invention.

The architecture of the low output reactor system 1600 is incorporated into a complete reactor assembly 1700 in FIG. 17. The reactor 1702 includes reactant fuel 1701 in a reactor chamber 1722. The reactor chamber 1722 can include membranes 1733 with which to contain the reactant fuel 1701 and provide an escape path for generated hydrogen gas. The reaction chamber 1722 can be either a rigid chamber or a flexible chamber. The reaction chamber 1722 can have membranes 1733 in multiple locations to enable the reaction chamber 1722 to be oriented in any number of directions. Surrounding the reactor chamber 1722 is the pressurized hydrogen gas 1788 within the outer hydrogen chamber 1793, which flows out the output valve 1766 as required by the particular application. As was the case with the general low output reactor system 1600 is shown in FIG. 16, water 1734 is supplied to reactor 1702 through a water supply line 1790. Water 1734 can be provided to the system by water displacement pump 1716 or by an external water source through water fill port 1717. Water re-pressurization is effected by water re-pressurization valve 1777. In this fashion, low output reactor system 1700 can provide hydrogen gas to an end application.

The reactor chamber 1722 can be fed with multiple water feed mechanisms. For example, a small pump can be integrated within the reactor 1702 to provide a fully disposable reactor with a reactor chamber, water, and pumping system. This pump can also be separated from the reactor. One example of a system with a separate pump is a spring driven system shown in FIG. 18.

Figure 18:
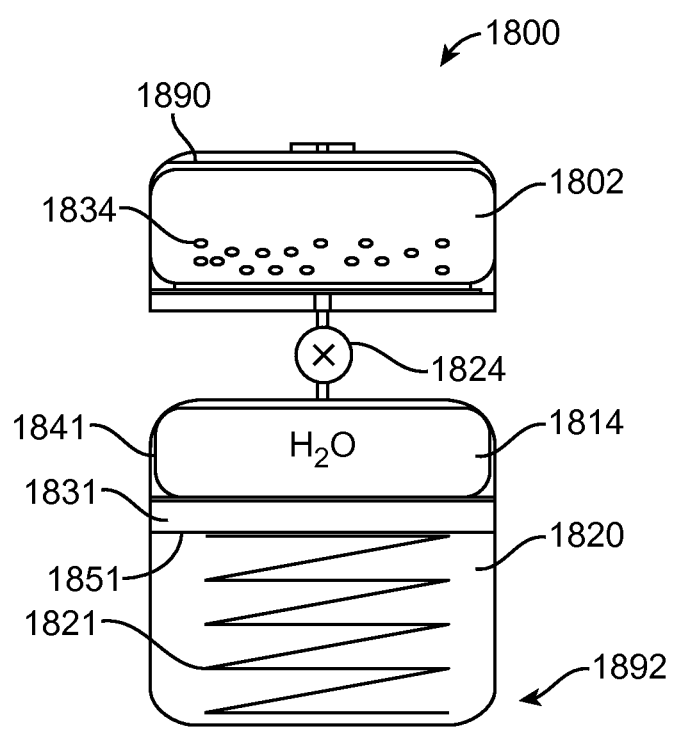
FIG. 18 shows a reactor with solid reactant fuel material connected by a valve to a spring-based liquid pump system.
Figure 21:
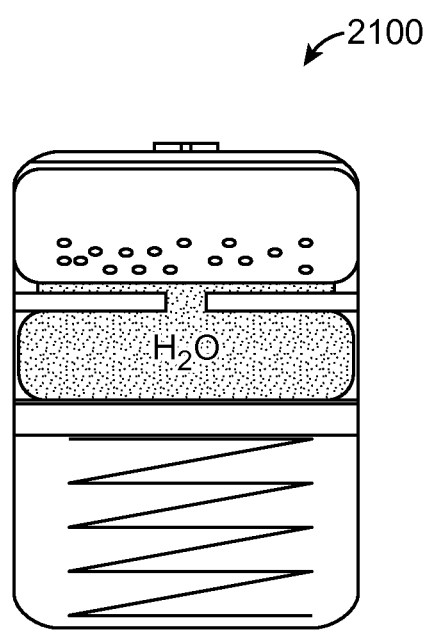
FIG. 21 shows a reactor with reactant fuel material and a spring based liquid pump system integrated within a single cartridge.
Figure 22A:
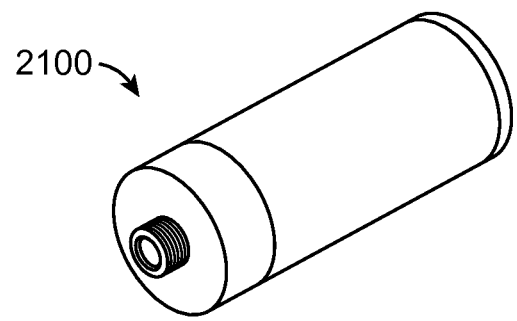
FIG. 22A shows a reactor with reactant fuel material and an integrated spring based liquid pump system.
Figure 22B:
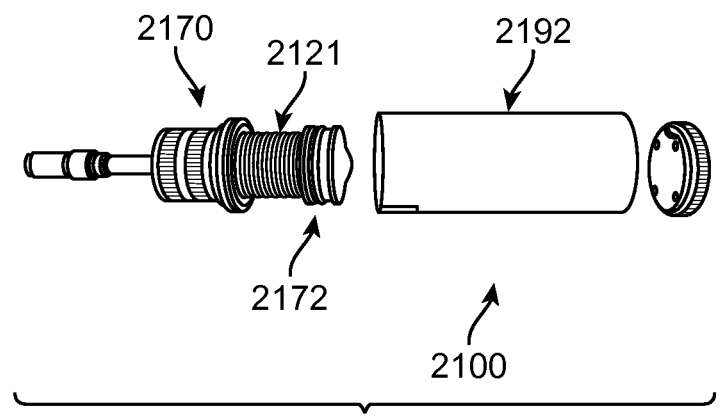
FIG. 22B shows three primary sub-assemblies of an integrated cartridge with a reactor and spring based liquid pump system.

FIG. 18 illustrates a spring driven reactor system 1800 with an integrated reactor chamber 1802, water supply 1814, and "pumping system" 1820. The reactor 1802 can also include a water spreader (discussed below with reference to FIG. 25). One example spring driven reactor system incorporates a spring 1821 that pushes on a sliding piston 1831 and applies pressure to a water chamber 1841, including water supply 1814. Additional implementations can also be employed with different piston alternatives, such as a flexible material, elastomers, bellows, or other structures that provide movement when a differential pressure is applied across them. In the case of a spring, a small platform area 1851 can be in contact with the edge of the spring 1821 to distribute the force over a greater area. Additionally, an example of a spring driven reactor system that is fabricated into a single body package 2100 is shown schematically in FIG. 21 and pictorially in FIGS. 22A and 23. FIGS. 22B and 24 provide exploded views of the spring driven reactor system in a single body package 2100.

Returning to FIG. 18, as the spring 1821 develops pressure in the water chamber 1841, water is injected into the reactor chamber 1802. Hydrogen is generated as water contacts the reactant fuel material. As hydrogen is generated, this creates pressure in the reactor chamber 1802, which stops the inlet of water. In this implementation, the water feed mechanism is orientation-independent. In the reactor system 1800 of FIG. 18, the reactor chamber 1802 is not orientation-independent, because aqueous solution could block the filter 1890, not allowing the hydrogen to pass thru when the system 1800 is upside down. To compensate for this, a reactor membrane system, such as the reactor chamber with membranes shown as reference numeral 1722 in FIG. 17, can be implemented with multiple pickups.

Figure 19:
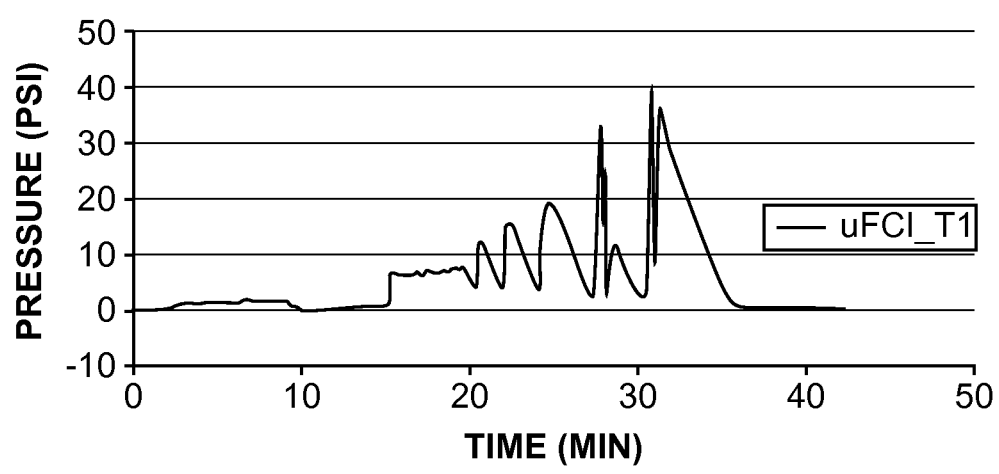
FIG. 19 shows a graphical depiction of oscillatory hydrogen generation over time in a spring-based liquid pump system without a coupling valve

Additionally, a check valve 1824 can be placed between the water feed 1814 and the reactor chamber 1802. Without such a hydrogen delivery system, hydrogen pressure pushes pack on the spring 1821 with excessive pressure, which in turn injects excessive water. The lack of a check valve could create an oscillatory system. For example, FIG. 19 shows an example pressure response over time in a system without a check valve. As shown by the graph in FIG. 19, an oscillatory pressure response is evident when pressure equalization means, such as a check valve, is not incorporated into the system.

Figure 20:
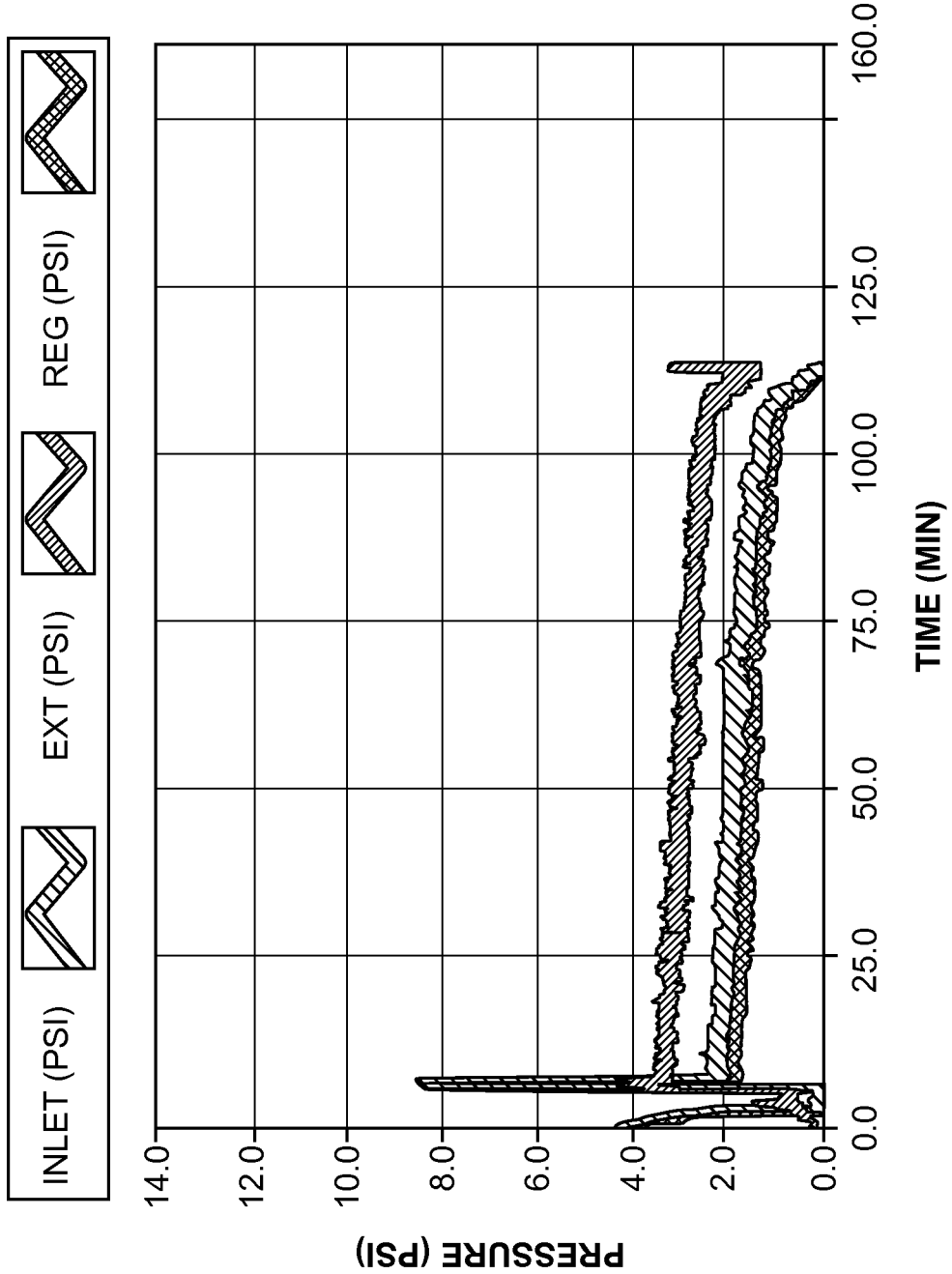
FIG. 20 shows a graphical depiction of hydrogen generation pressure over time in a spring-based liquid pump system with a coupling valve.

In contrast, FIG. 20 shows an example pressure response over time in a system utilizing a check valve. The pressure response in FIG. 20 does not exhibit an oscillatory response and instead shows a steady decay associated with the spring pressure.

As also shown in FIG. 20, an initial peak at the beginning of the reaction occurs as an initial slug of water is injected into the reactor. This effect can be dampened using a water flow restrictor, or it can be increased to create a momentary transient level of high transient hydrogen generation to facilitate fuel cell stack purging. For example, in addition to the check valve 1824, a method to slow the water flow during restarting condition can be implemented using a water flow limiter. During a restart, the instantaneous hydrogen pressure can drop to a very low value, creating an injection of water that could result in a large reaction spike. A flow limiter function can be incorporated into the water distribution function to prevent such an effect. The use of a check facilitates near constant pressure operation as determined by the spring design. Other mechanisms for the check valve feature can also be used, such as a control valve or regulator, and the like.

Figure 25:
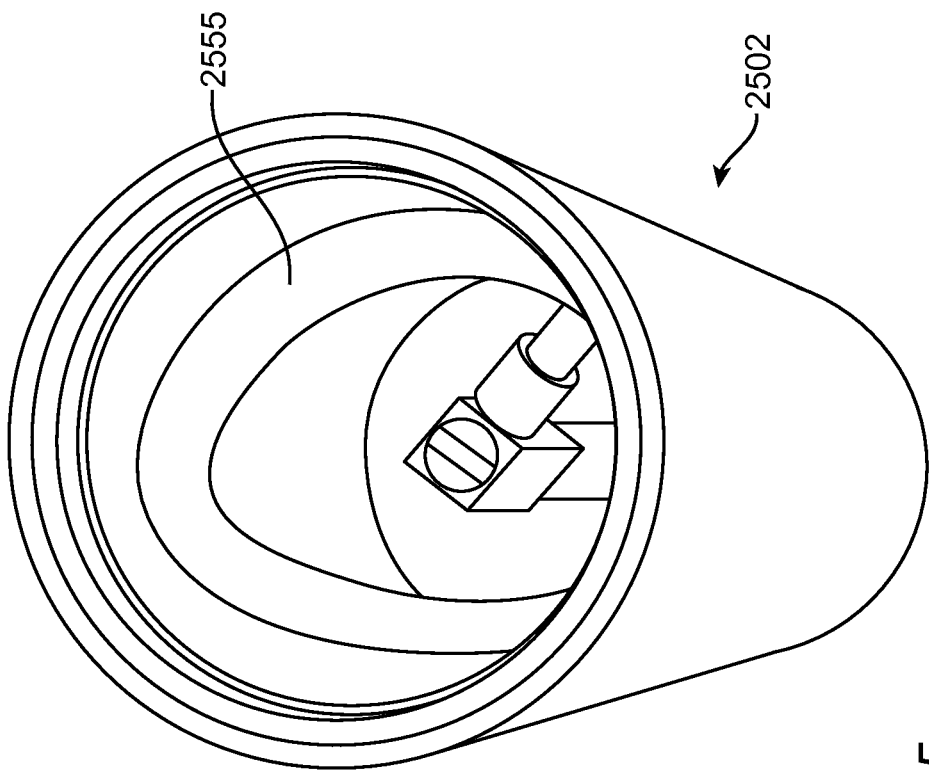
FIG. 25 illustrates water feed distribution mechanisms.
Figure 25:
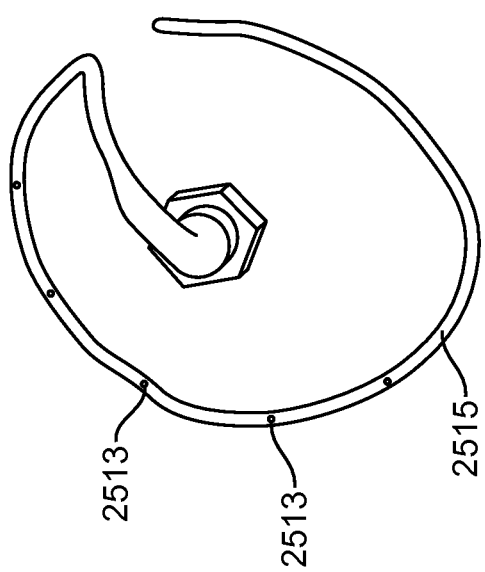

In the passive architecture reactor systems, the water spreading and distribution can be performed using a number of techniques. For example, as shown in FIG. 25, the water spreader 2515 can be a small diameter tube with small distribution holes 2513. The water distribution system can also incorporate a network of holes in a silicone tube 2555 as seen inside the reactor cavity 2502. The hole spacing, sizing, and type variability has been described above with regard to the nozzles. Additionally, the hole sizes in the silicone tube 2555 structures can provide additional flexibility. As outlined above, small holes can be subject to clogging by the generated reaction waste products, so the use of silicone tubing 2555 can allow for the pressure to create a wider hole opening up around a clog and then forcing the blockage out of the hole. Other water distribution mechanisms such as borosilicate fibers, for example, and other water wicking materials can also be used to distribute water throughout the reaction area. These water distribution techniques can be used with any type of pump or control system architecture.

As shown schematically in FIG. 18, one example of a two-part reactor system 1800 includes the reactant fuel material 1834 in one primary component or container such as reactor 1802, and the aqueous solution is initially within another primary component or container, such as aqueous solution canister 1892. The reactor 1802 can be disposed of or recycled once the reaction is complete, while the aqueous solution canister 1892 is reusable and refillable by a user. These two primary components 1802, 1892 are termed a "reactor and water feed system." In the example shown in FIG. 18, a complete hydrogen generation system is made up of two core components: a reactant fuel reactor 1802 and an aqueous solution canister 1892. These two separate canisters 1802, 1892 are connected together, and interact to generate hydrogen gas. Alternatively, as discussed above, these two canisters 1802, 1892 can simply be connected together through a water inlet valve, while a control system (e.g., fuel cell system, consumer end product, and the like) provides the mechanical rigidity to hold the canisters in place and release them accordingly. Furthermore, the entire water feed system can reside within the control system as a non-separable and/or removable component.

An interface valve 1824 can reside in the reactor 1802, in the feed system 1892, and/or in both. When the reactor 1802 and the water feed 1892 are connected, the interface valve may not allow hydrogen pressure to deflect the spring 1821. This can be accomplished by including features of a check valve or a controlled on/off valve in the interface valve 1824. In a separate implementation, if the interface valve 1824 does not provide such feature, separate features can be employed to prohibit reverse movement of the spring, such as controlling the piston assembly with a screw drive or other mechanism that does not allow the water fed system to be significantly pressurized with hydrogen gas.

Figure 23:
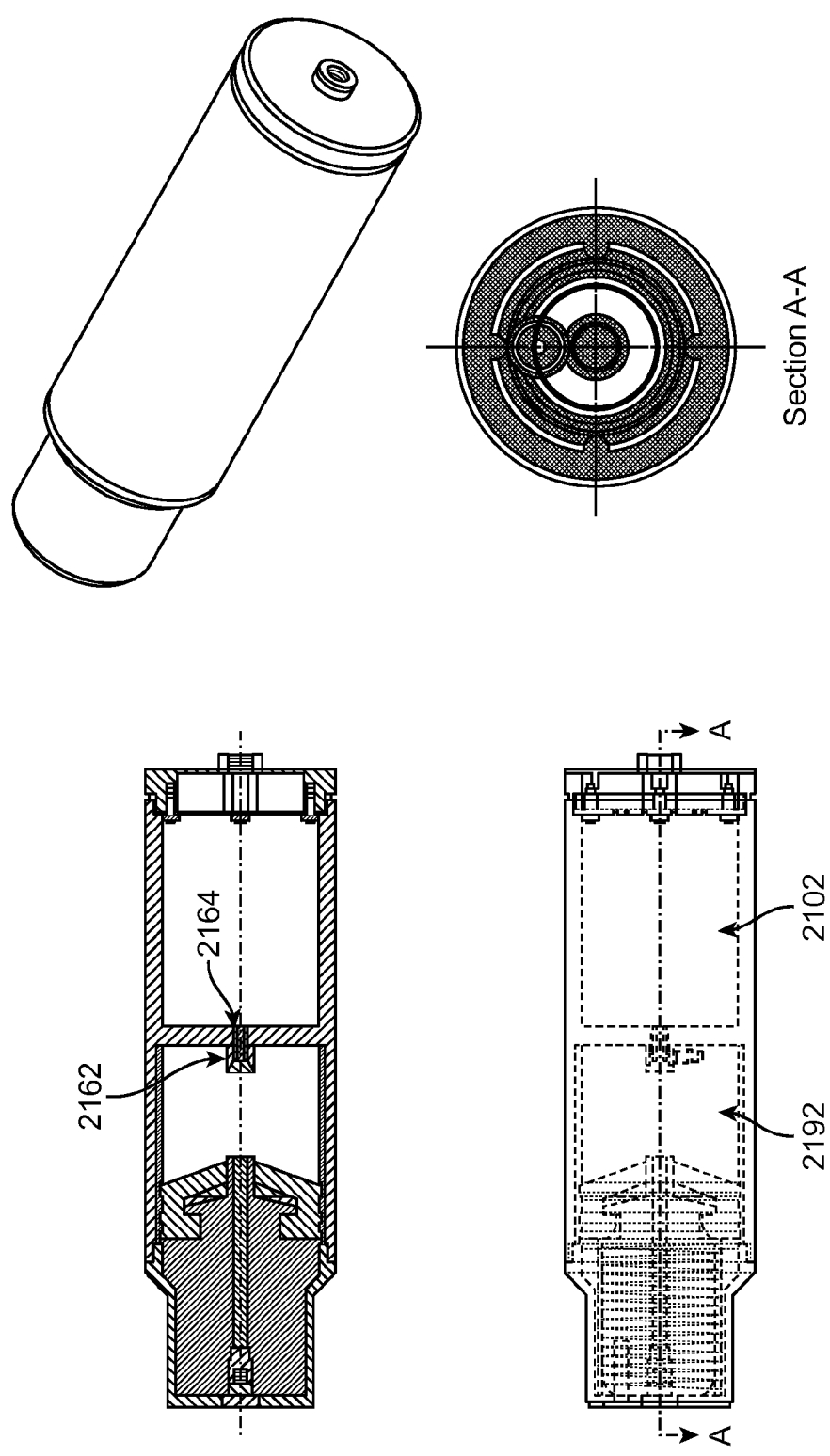
FIG. 23 shows a perspective view and cross-section of an integrated cartridge with a reactor and spring based liquid pump system
Figure 24:
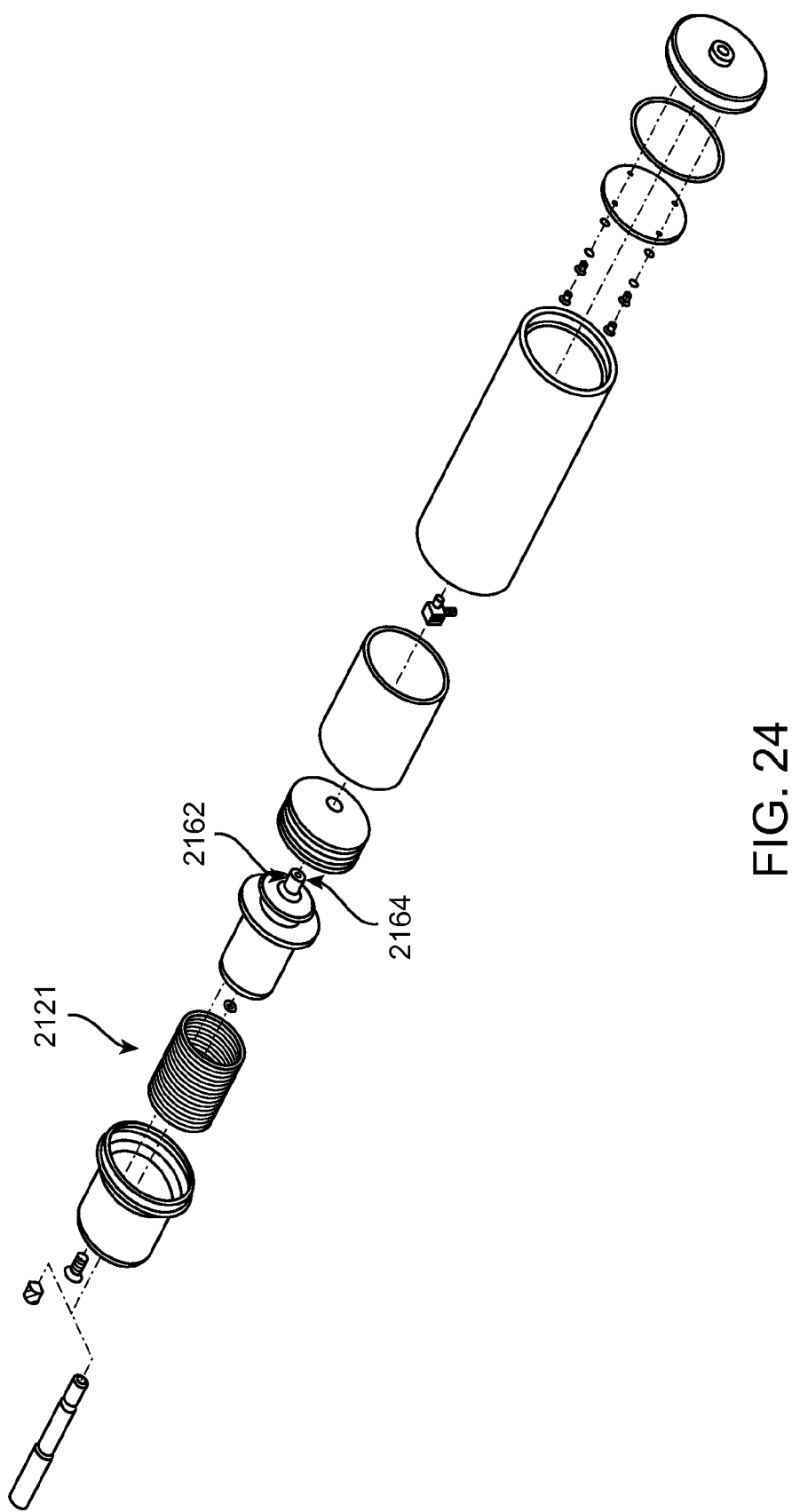
FIG. 24 shows an assembly view of an integrated cartridge

FIGS. 22-24 show example core components in this system implementation. As shown in FIG. 22B, a metal spring 2121 is employed in the water canister 2192 to generate pressure and to provide a means for water to flow into the reactor canister. The metal spring 2121 in this example is a tapered conical extension spring, but other spring types can also be used, such as torsion, clock, inverted tapered conical, compression, and others. The spring 2121 can be mounted securely to the base 2170 of the canister 2192, and to a plunger 2172. Furthermore, the spring 2121 is centered to prevent plunger yaw. The plunger 2172 shown in FIG. 22B has integrated features to guide and seal as the plunger 2172 slides, but other water delivery designs can be used. For example, as discussed above, a different example can employ a flexible "bag," which delivers water under compression to a reactor.

A check valve 2162 and orifice 2164 (shown in FIG. 23) are incorporated into the water outlet between the water canister 2192 and powder (reactor) canister 2102. The check valve 2162 serves to prevent hydrogen pressure from re-pressurizing the water canister 2192, and thus prevents system instability. In other examples, the check valve 2162 can also seal upon water canister/reactor disconnection. In other examples, the check valve 2162 can also relieve pressure if excessive pressures are developed in the system. The orifice 2164 serves to limit water flow to the reactor 2102 during periods of high differential pressures between the water and reactor canisters 2102, 2192.

Figure 26:
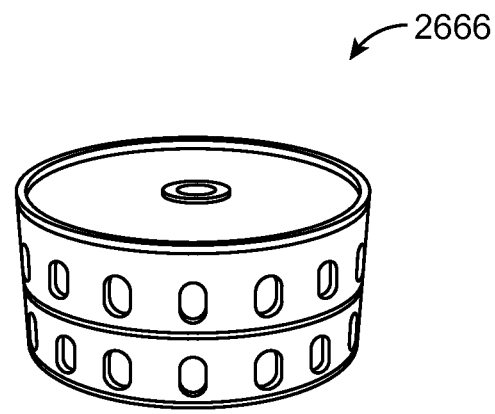
FIG. 26 shows a threaded locking mechanism to couple a separable liquid feed/reactor hydrogen generation device.
Figure 27:
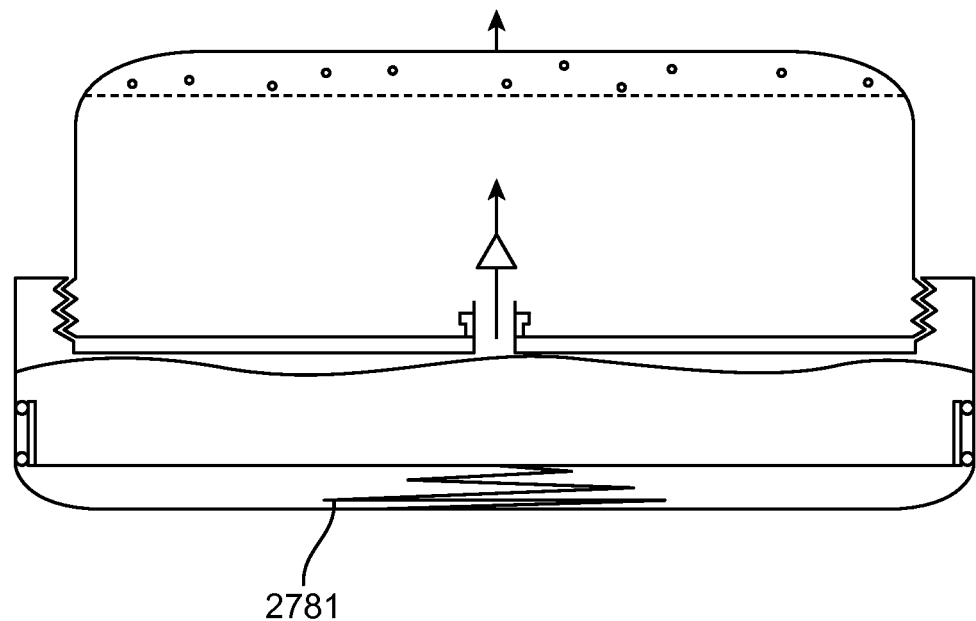
FIG. 27 shows a schematic representation of a separable liquid feed/reactor hydrogen generation device.

As shown in FIGS. 26 and 27, in other implementations, the reactor and water feed sub-systems are separable. For example, as shown in FIG. 26, one example implementation employs a threaded locking mechanism 2666 to couple the two canisters 2102, 2192. Other locking designs can also be used such as a click to lock mechanism, or fine (10-32) internal and external threading on the water feed port. The threads of the locking mechanism do not have to seal against water or hydrogen, and O-ring or gasket type seals can be used to couple the water to reactor canister interface.

The canisters in this example are both thin walled pressure vessels as described above. The reaction canister can be constructed with base corrosion resistant materials, such as nickel plated aluminum and the like. The water canister can be constructed from light metals or engineering plastics. The water canister can have a locking mechanism that prevents water flow when the canisters are disconnected or removed. The locking mechanism can be a mechanical latch that requires user intervention for water to flow. Alternatively, the reactor can contain a valve or other mechanism which stops water flow until there is user interaction. Example user interactions include a physical switch or a valve actuated by a motion of inserting the canister into fuel cell system assembly.

Figure 28:
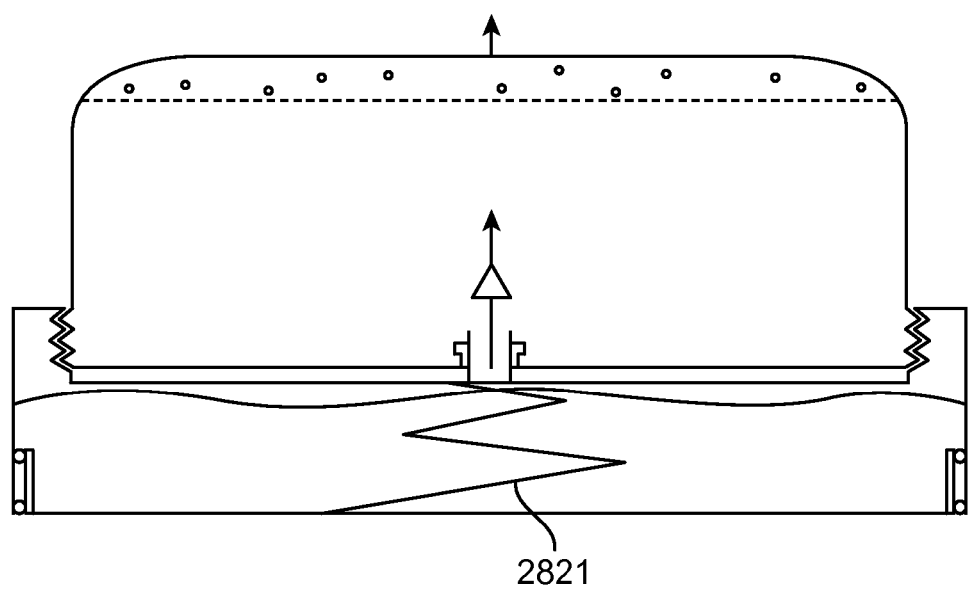
FIG. 28 shows a schematic representation of a separable liquid feed/reactor hydrogen generation device with a conical/collapsing spring

Additionally, the spring as part of the water feed system can be configured to be outside the water as shown in the example of FIG. 27 or inside the water as shown in FIG. 28. If the spring is located inside the water, corrosion inhibitors can be added to the aqueous solution or the spring materials can be properly selected to limit corrosion.

Figure 29A:
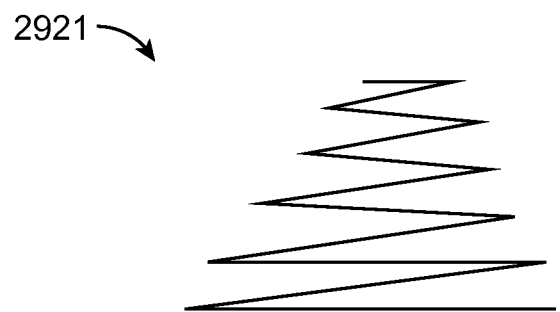
FIGS. 29A-29B depict normal and compressed views of a collapsible spring to facilitate limited variability in force over travel.
Figure 29B:
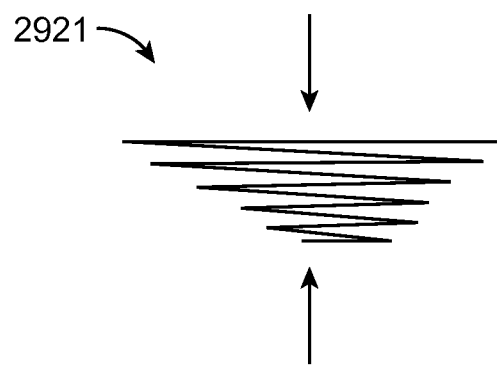

As shown in the examples of FIGS. 29A and 29B, a number of different configurations can be used to keep a near constant water pressure the entire time of water insertion into the reactor. The springs can be selected so the actual travel distance is short in relation to the total compression distance. One method to accomplish this is by using an inverted conical spring as shown in FIGS. 29A and 29B. A long uncompressed spring 2921 can be compressed and inverted (as shown in FIG. 29B) so that it pulls down flat while still under pressure. This enables the spring compression volume to be minimal while still providing the necessary force.

Volume Considerations

Figure 30A:
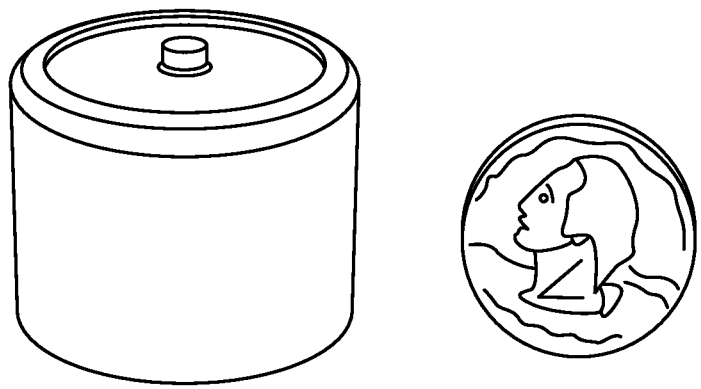
FIG. 30A shows a perspective view of a hydrogen generation cartridge with a spring based liquid feed and a volume exchanging system
Figure 30B:
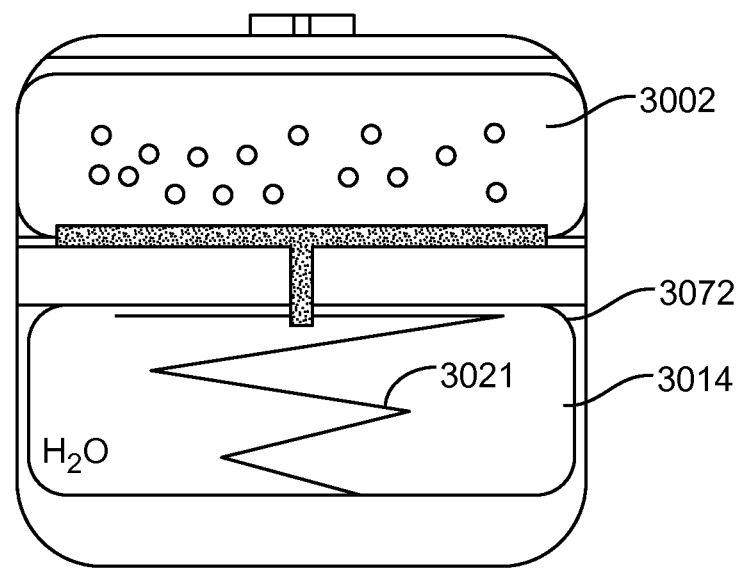
FIG. 30B shows a schematic representation of a hydrogen generation cartridge with a spring based liquid feed and a volume exchanging system.
Figure 31:
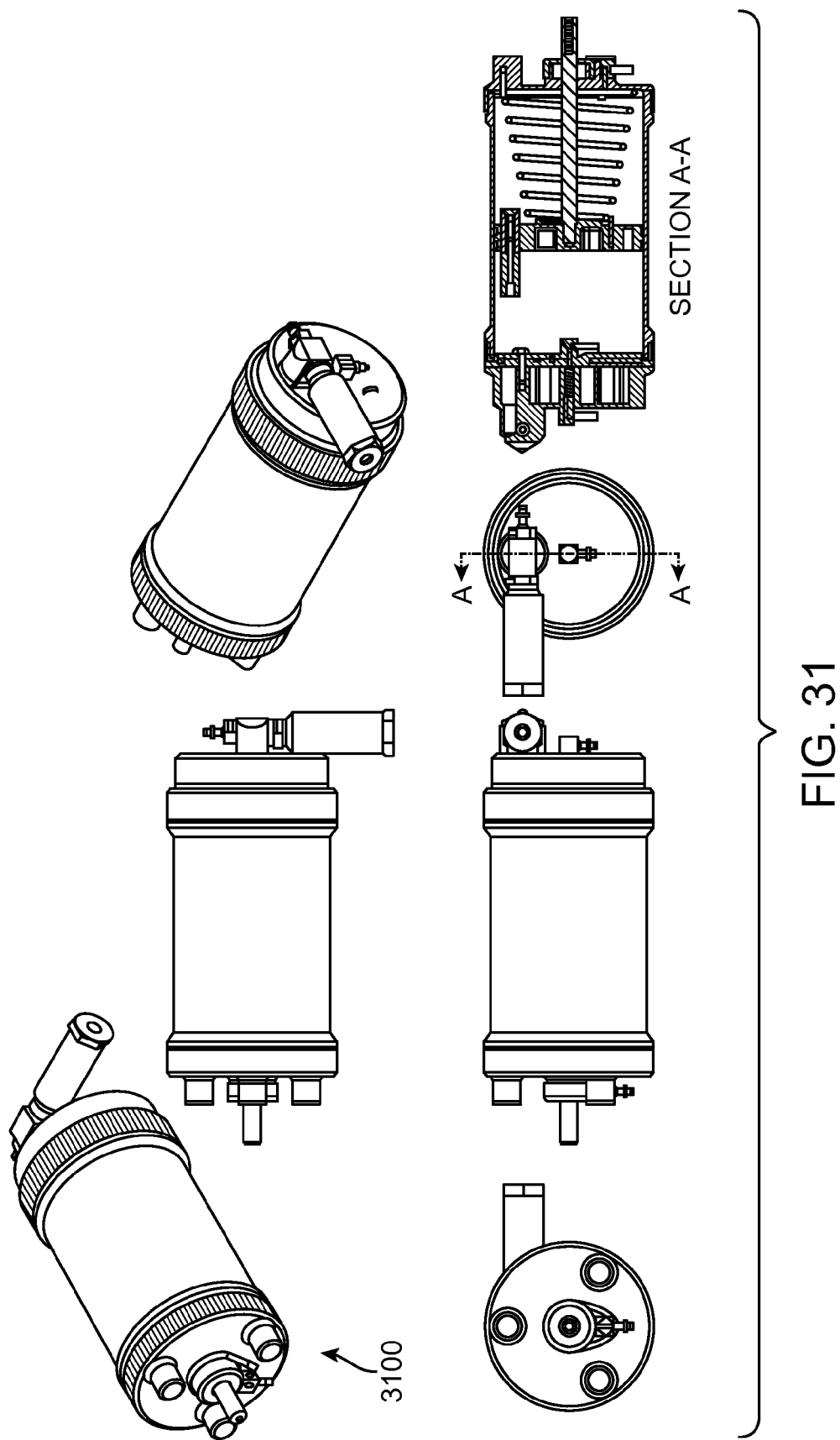
FIG. 31 shows perspective and cross-sectional views of a hydrogen generation cartridge with a volume exchanging, spring based liquid feed.
Figure 32:
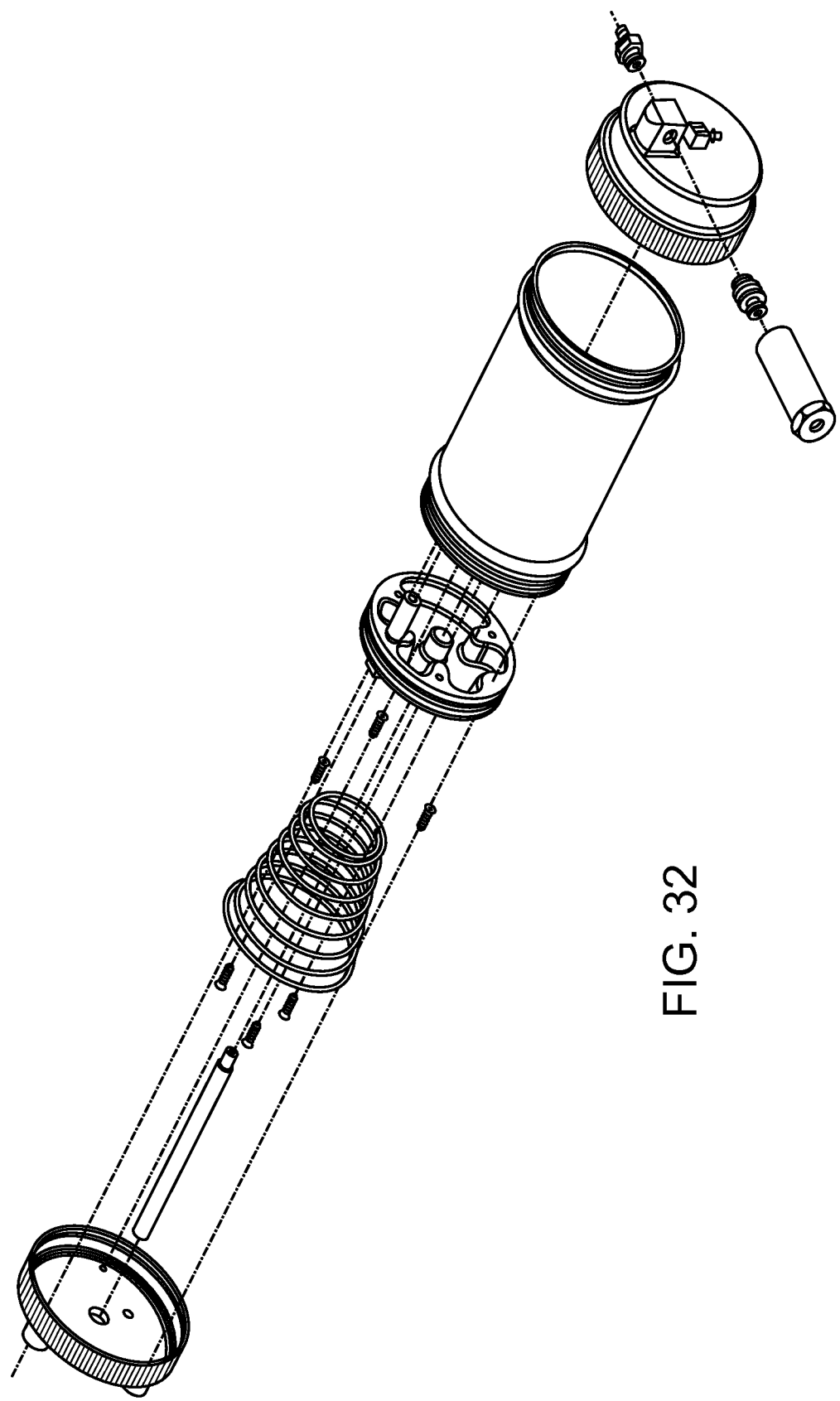
FIG. 32 shows an assembly view and a cross-sectional view of a hydrogen generation cartridge with volume exchanging, spring based liquid feed.
Figure 33:
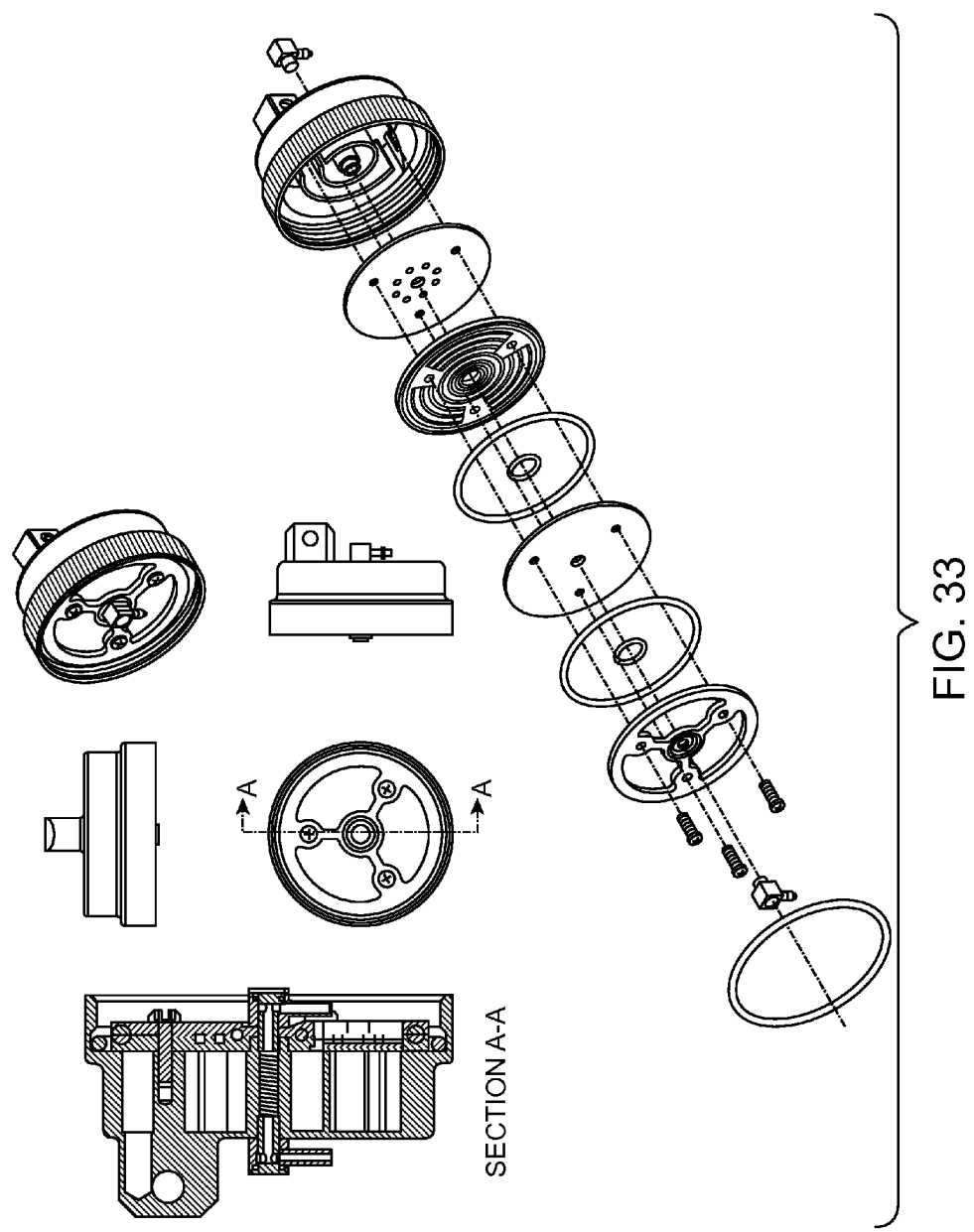
FIG. 33 shows an assembly view of an integrated cartridge filtration system example.

Some users may require configurations that are as small a volume as possible with all of the required water included within the package to minimize user complexities. In one example shown in FIGS. 30A and 30B, the reactor volume 3002 starts off small initially and grows over time as aqueous solution is depleted and added to the point(s) of reaction. The reactor volume 3002 starts off in a very compressed state. Over time, a piston 3072 or similar mechanism is used to exchange reactor volume 3002 for water feed volume 3014. The driving force behind this can be a dynamic pumping mechanism, a spring driven mechanism, or other mechanism. In one implementation, the system is designed so that the generated hydrogen pressure does not contribute to the water delivery pressure by use of a screw-drive piston assembly, expanding gasket, or the like. In another implementation, the system is designed so that the generated hydrogen pressure does not contribute to the water delivery pressure by use of a control valve or pressure regulator as part of the water delivery system. With the spring driven mechanism shown in FIG. 30B, an inverted tapered spring 3021 is shown which allows for minimization of the water feed volume 3014 at conclusion of the reaction while still providing an acceptable force as the spring assembly can compress to be near flat while still being in an unrelaxed state. This approach uses a comparable piston (or other method), an aqueous solution distribution network, an aqueous solution flow limiter, and an integrated check valve or comparably functioned component (not shown). Mechanisms may be employed which mechanically lock the spring in place or stop aqueous solution from flowing, such as a valve or other mechanism. The aqueous solution may flow on the outside of the cartridge and can be routed through the piston geometry. Valves, regulators, or other control components can be used on the water feed line as well. Geometries and designs may be employed so that only force applied by the spring creates water displacement. For example, mechanisms such as threaded interfaces can be incorporated so that an instantaneous increase in hydrogen pressure does not translate to an instantaneous increase in water pressure. Other features such as an expanding bellows and others can be employed. Additionally, FIGS. 31-33 show a larger version of a cartridge 3100 that can be used in systems such as fuel cells for laptop computer power.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as can be specified in the claims. Accordingly, the invention is limited only by the following claims and equivalents thereto.

The claimed invention is:

1. A method of generating hydrogen gas utilizing a positive pressure, the method comprising:
   inserting a reactant material mixture comprising at least one of sodium silicide, sodium silica gel, or sodium borohydride into a reactor;
   imparting a force on a solution chamber with a spring to pressurize an aqueous solution contained in the solution chamber;
   adding the aqueous solution via delivering the pressurized aqueous solution with a water feed system via a solution inlet fill port to the reactant material contained in the reactor to form a mixture comprising aqueous solution and reactant material that reacts to generate hydrogen gas;

filtering at least one of the reactant material, the aqueous solution, the hydrogen gas, or the reaction waste product;

routing the generated hydrogen gas from the reactor via a hydrogen outlet port to an industrial application; and controlling hydrogen generation by one of the ratio of reactant material to aqueous solution or composition of the reactant material mixture.

2. The method of generating hydrogen gas of claim 1, the method further comprising:

assessing at least one parameter of the reaction of the reactant material and the aqueous solution in the reactor, wherein the assessment includes monitoring at least one of temperature in the reactor, electrical conductivity, pressure in the reactor, weight of reaction, amount of un-reacted reactant material, elapsed time of reaction, amount of aqueous solution in the reactor, or a maximum amount of aqueous solution to be added to the reactor.

3. The method of generating hydrogen gas of claim 1, wherein the filtering is performed using at least one of a hydrogen separation membrane, a chemical filter, a desiccant filter, a coarse media filter, a dryer filter, or a secondary reactor chamber.

4. The method of generating hydrogen gas of claim 1, the method further comprising:

directing a portion of the aqueous solution to areas of the reactor to recapture a waste product resulting from the combination of the reactant material and the aqueous solution.

5. The method of generating hydrogen gas of claim 4, the method further comprising:

adding the portion of the aqueous solution to a secondary reactor chamber; and passing the generated hydrogen gas through the portion of the aqueous solution in the secondary reactor chamber.

6. The method of generating hydrogen gas of claim 5, the method further comprising:

passing the generated hydrogen gas through the portion of the aqueous solution to perform at least one of particulate collection, chemical filtration, humidification, or condensation.

7. The method of generating hydrogen gas of claim 1, the method further comprising:

regulating the pressure of the aqueous solution delivered to the reactant fuel material in the reactor with a check valve, wherein the pressure is regulated based upon characteristics of the spring.

8. The method of generating hydrogen gas of claim 7, wherein regulating the pressure of the aqueous solution with the check valve includes regulating the pressure of the delivered aqueous solution as a steady decay associated with the spring force.

9. The method of generating hydrogen gas of claim 7, the method further comprising:

preventing hydrogen gas from deflecting the spring.

10. The method of generating hydrogen gas of claim 1, the method further comprising:

dampening the pressure of the delivered aqueous solution initially delivered to the reactant fuel material to start or restart a reaction with a water flow limiter.

11. The method of generating hydrogen gas of claim 1, the method further comprising:

measuring at least one of water pressure, hydrogen pressure, spring force, and spring displacement with a force gauge; and determining a state of the reaction of the aqueous solution and the reactant fuel material based upon at least one of the measured water pressure, hydrogen pressure, spring force, and spring displacement.

12. The method of generating hydrogen gas of claim 11, wherein the force gauge includes a microcontroller with a database to measure at least one of water pressure, hydrogen pressure, spring force, and spring displacement to determine the state of the reaction.

13. The method of generating hydrogen gas of claim 11, wherein determining the state of the reaction includes determining at least one of an amount of reactant fuel material that has been reacted and an amount of reactant fuel material that remains in the reactor.

14. A method of generating hydrogen gas, the method comprising:

inserting a reactant material into a reactor, said reactant material including at least one of sodium silicide powder, sodium borohydride, or sodium silica gel;

imparting a force on a solution chamber with a spring to pressurize an aqueous solution contained in the solution chamber;

adding the aqueous solution via delivering the pressurized aqueous solution with a water feed system via a solution inlet fill port to the reactant material in the reactor to generate hydrogen gas;

routing the generated hydrogen gas from the reactor via a hydrogen outlet port to an industrial application;

directing a portion of the aqueous solution to areas of the reactor to recapture a waste product resulting from the combination of the reactant material and the aqueous solution.

15. The method of generating hydrogen gas of claim 14, the method further comprising:

adding the portion of the aqueous solution to a secondary reactor chamber; and passing the generated hydrogen gas through the portion of the aqueous solution in the secondary reaction chamber.

16. The method of generating hydrogen gas of claim 14, the method further comprising:

filtering at least one of the reactant material, the aqueous solution, the hydrogen gas, or the reaction waste product.

17. The method of generating hydrogen gas of claim 16, wherein filtering is performed using at least one of a hydrogen separation membrane, a chemical filter, a desiccant filter, a coarse media filter, a dryer filter, or a secondary reactor chamber.

* * * * *